United States Patent
Parham

(10) Patent No.: US 7,519,736 B2
(45) Date of Patent: *Apr. 14, 2009

(54) NON-INVASIVE LATENCY MONITORING IN A STORE-AND-FORWARD REPLICATION SYSTEM

(75) Inventor: Jeffrey B. Parham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

This patent is subject to a terminal disclaimer.

(21) Appl. No.: 11/357,601

(22) Filed: Feb. 17, 2006

(65) Prior Publication Data

US 2006/0168120 A1 Jul. 27, 2006

Related U.S. Application Data

(63) Continuation of application No. 09/995,121, filed on Nov. 27, 2001, now Pat. No. 7,035,922.

(51) Int. Cl.
*G06F 15/173* (2006.01)
(52) U.S. Cl. .................. 709/244; 709/242; 709/224; 707/201; 707/203
(58) Field of Classification Search ............. 709/224, 709/242, 244; 707/201, 203
See application file for complete search history.

(56) References Cited

U.S. PATENT DOCUMENTS

| | | | |
|---|---|---|---|
| 4,873,517 A | 10/1989 | Baratz et al. | |
| 5,261,051 A | 11/1993 | Masden et al. | |
| 5,313,630 A | 5/1994 | Namioka et al. | |
| 5,551,027 A | 8/1996 | Choy et al. | |
| 5,588,147 A | 12/1996 | Neeman | |
| 5,608,903 A | 3/1997 | Prasad et al. | |
| 5,649,194 A | 7/1997 | Miller | |
| 5,675,787 A | 10/1997 | Miller et al. | |
| 5,698,121 A | 12/1997 | Kosaka et al. | |
| 5,713,017 A | 1/1998 | Lin et al. ................. 707/8 |
| 5,768,519 A | 6/1998 | Swift et al. | |
| 5,774,552 A | 6/1998 | Grimmer | |

(Continued)

OTHER PUBLICATIONS

"Comparing Microsoft Active Directory to Novell's NDS," Microsoft Corporation®, Sep. 1998, [26 pages].

(Continued)

*Primary Examiner*—Kenny S Lin
*Assistant Examiner*—Duyen Doan
(74) *Attorney, Agent, or Firm*—Merchant & Gould PC

(57) ABSTRACT

A method for monitoring replica servers in a networked computer system is provided, in which each server in the system has a replica partner vector table that includes state information about other servers in the system. The replica partner vector table includes data fields for storing an update sequence number (USN) and timestamp information that identifies the time of the last update and/or the time last successful replication attempt for each replica server in the system. After each successful replication, the server updates the entries in the replica partner vector to reflect the updated USN and timestamp information. The replica monitoring method evaluates the USN and timestamp entries in the replica partner vector table to determine if any servers in the system are latent. If the monitoring method detects that a server in the system is latent, an alert is generated whereby users and/or a network administrator are informed of the problem.

4 Claims, 10 Drawing Sheets

U.S. PATENT DOCUMENTS

| | | | |
|---|---|---|---|
| 5,787,441 | A | 7/1998 | Beckhardt |
| 5,787,442 | A | 7/1998 | Hacherl et al. |
| 5,806,074 | A | 9/1998 | Souder et al. |
| 5,832,225 | A | 11/1998 | Hacherl et al. |
| 5,832,275 | A | 11/1998 | Olds |
| 5,832,487 | A | 11/1998 | Olds et al. |
| 5,832,506 | A | 11/1998 | Kuzma |
| 5,884,322 | A | 3/1999 | Sidhu et al. |
| 5,926,816 | A | 7/1999 | Bauer et al. |
| 5,944,840 | A * | 8/1999 | Lever .......................... 714/34 |
| 5,968,121 | A | 10/1999 | Logan et al. |
| 5,968,131 | A | 10/1999 | Mendez et al. |
| 6,049,809 | A | 4/2000 | Raman et al. |
| 6,052,724 | A | 4/2000 | Willie et al. |
| 6,058,401 | A | 5/2000 | Stamos et al. |
| 6,138,124 | A | 10/2000 | Beckhardt |
| 6,212,557 | B1 | 4/2001 | Oran |
| 6,247,017 | B1 | 6/2001 | Martin |
| 6,301,589 | B1 | 10/2001 | Hirashima et al. |
| 6,324,571 | B1 | 11/2001 | Hacherl |
| 6,343,299 | B1 | 1/2002 | Huang et al. |
| 6,377,950 | B1 | 4/2002 | Peters et al. |
| 6,427,209 | B1 | 7/2002 | Brezak et al. |
| 6,446,077 | B2 | 9/2002 | Straube et al. |
| 6,446,092 | B1 | 9/2002 | Sutter |
| 6,449,739 | B1 | 9/2002 | Landan ......................... 714/47 |
| 6,453,326 | B1 | 9/2002 | Parham et al. |
| 6,457,011 | B1 | 9/2002 | Brace et al. |
| 6,457,053 | B1 | 9/2002 | Satagopan et al. |
| 6,516,327 | B1 | 2/2003 | Zondervan et al. |
| 6,529,917 | B1 | 3/2003 | Zoltan |
| 6,532,479 | B2 | 3/2003 | Souder et al. |
| 6,539,381 | B1 * | 3/2003 | Prasad et al. .................. 707/10 |
| 6,643,670 | B2 | 11/2003 | Parham et al. .............. 707/201 |
| 6,647,393 | B1 | 11/2003 | Dietterich et al. |
| 6,751,634 | B1 | 6/2004 | Judd |
| 6,823,338 | B1 | 11/2004 | Byrne et al. |
| 6,865,576 | B1 | 3/2005 | Gong et al. |
| 6,879,564 | B2 | 4/2005 | Parham et al. |
| 6,901,433 | B2 | 5/2005 | San Andres et al. |
| 7,035,922 | B2 * | 4/2006 | Parham ....................... 709/224 |
| 7,162,499 | B2 | 1/2007 | Lees et al. |
| 7,184,359 | B1 | 2/2007 | Bridgewater et al. |
| 7,185,359 | B2 | 2/2007 | Schmidt et al. |
| 7,200,847 | B2 | 4/2007 | Straube et al. |
| 2002/0120367 | A1 | 8/2002 | Parham et al. |
| 2002/0120770 | A1 | 8/2002 | Parham et al. |
| 2002/0162030 | A1 | 10/2002 | Brezak et al. |
| 2003/0088654 | A1 * | 5/2003 | Good et al. ................. 709/223 |
| 2006/0026165 | A1 | 2/2006 | Mohamed et al. |
| 2006/0085428 | A1 | 4/2006 | Bozeman et al. |
| 2006/0168120 | A1 | 7/2006 | Parham |
| 2006/0184589 | A1 | 8/2006 | Lees et al. |
| 2006/0200831 | A1 | 9/2006 | Straube et al. |
| 2007/0162519 | A1 | 7/2007 | Straube et al. |

OTHER PUBLICATIONS

"Microsoft Active Directory Service Interfaces: ADSI Open Interfaces for Managing and Using Directory Services", Microsoft Corporation, 1999, [35 pages].

"Technique for replicating distributed directory information," IBM Technical Disclosure Bulletin, IBM Corp. ,vol. 33, No. 12, May 1, 1991, pp. 113-120, [4 pages].

"Active Directory Service Interfaces -The Easy Way to Access and Manage LDAP-Based Directories (Windows NT 4.0)," Microsoft Corp., Feb. 1997, [10 pages].

"NetOp® Policy Server, Version 3.0, Quick Guide," Document revision: 2004313, 1981-2005, [30 pages].

Acevedo, B. et al. "Highly available directory services in DCE," In Proceedings of the Symposium on Principles of Distributed Computing (PODC'95), Aug. 1995, pp. 387-391.

Amir, Yair. "Replication Using Group Communication Over a Partitioned Network," Ph. D. Dissertation, Institute of Computer Science, The Hebrew University of Jerusalem, Isreal, 1995, [95 pages].

Ashfield, J.C. et al. "System-independent file management and distribution services" IBM Systems Journal, IBM Corp., vol. 28, No. 2, Jan. 1989, pp. 241-259.

Beedubail, Ganesha; Pooch, Udo. "An Architecture for Object Replication in Distributed Systems," Proceedings of the International Conference on Parallel and Distributed Processing Techniques and Applications, PDPTA'97, Department of Computer Science, Texas A&M University, Technical Report (TR_96-006), Mar. 1996, [21 pages].

Bennett, J.M.; Bauer, M.A. "An Analysis of Replication Strategies for X.500-like Distributed Directories," Workshop on the Management of Relpicated Data, IEEE Computer Society Press, Nov. 1990, pp. 137-142.

Bloch, Joshua J.; Daniels, Dean S.; Spector, Alfred Z. "A weighted voting algorithm for replicated directories," Journal of the ACM, 34(4), ACM, Oct. 1987, pp. 859-990.

Carter, John et al. "Khazana An Infrastructure for Building Distributed Services," Proceedings of the ICDCS'98, IEEE, May 1998, [10 pages].

Chappell, David. "New distributed services give Windows NT a boost in large networks", May 1998, pp. 1-7.

Cheung, Roger Y. M. "From Grapevine to Trader: The Evolution of Distributed Directory Technology," Proceedings of the 1992 conference of the Centre for Advanced Studies on Collaborative research—vol. 2, Ontario, Canada 1992, pp. 375-389.

Cho, Haengrae. "Catalog Management in Heterogeneous Distributed Database Systems," Communications, Computers and Signal Processing, 1997. '10 Years PACRIM 1987-1997—Networking the Pacific Rim', IEEE, Aug. 1997, pp. 659-662.

Ferreira, Joao; Borbinha, J.L; Delgado, Jose. "Using LDAP in a Filtering Service for a Digital Library," 5th DELOS Workshop, Budapest, Nov. 1997, [5 pages].

Howes, Timothy A., "The Lightweight Directory Access Protocol: X. 500 Lite,"Technical Report CITI TR 95-8, University of Michigan, Jul. 1995, 11 pages.

Jagadish, H.V.; Jones, M.A; Srivastava, D.; Vista, D. "Flexible list management in a directory," In Proceedings of the Seventh International Conference on Information and Knowledge Management (CIKM), ACM, Washington, DC, Nov. 1998, pp. 10-19.

Kaashoek, M.F.; Tanenbaum, A.S.; Verstoep, K. "Using Group Communication to Implement a Fault-Tolerant Directory Service," Proceedings of the 13th International Conference on Distributed Computing Systems, IEEE, May 1993, pp. 130-139.

Keleher, Peter J. "Decentralized Replication Mechanisms in Deno," University of Maryland Computer Science Department, *Technical Reports from UMIACS* and *Technical Reports of the Computer Science Department*, CS-TR-3940 UMIACS, UMIACS-TR-98-54, Oct. 1998, [6 pages].

Lee, Keith K.S.; Chin, Y.H. "A New Replication Strategy for Unforeseeable under Agent-Based Mobile Computing System," 1998 International Conference on Parallel and Distributed Systems (ICPADS'98), IEEE, 1998, [8 pages].

Maass, Henning. "Open Mobility Management Platform With Directory-Based Architecture And Signalling Protocols," Open Architectures and Network Programming, IEEE, 1998, pp. 72-87.

Mann, T.; Hisgen, A.; Swart, G. "An Algorithm for Data Replication," Report 46, DEC System Research Center, Palo Alto, Calif., Jun. 1, 1989, [61 pages].

Mullender, S.; Van Rossum, G.; Tanenbaum, A.; Van Renesse, R; Van Staveren, H. "Amoeba: A Distributed Operating System for the 1990s", IEEE Computer 23, May 1990, pp. 44-53.

Ordille, J.; Miller, B. "Distributed Active Catalogs and Meta-Data Caching in Descriptive Name Services," Thirteenth International IEEE Conference on Distributed Computing Systems, May 1993, pp. 120-129.

Sarin, Sunil; Floyd, Richard; Phadnis, Nilkanth, "A flexible algorithm for replicated directory management," In Proceedings of the Ninth International Conference on Distributed Computing Systems, IEEE, June 1989, pp. 456-464.

Severance, Charles. "Could LDAP Be the Next Killer DAP?," *Computer*, vol. 30, No. 8, Aug. 1997, pp. 88-89.

Walker, Bruce; Popek, Gerald; English, Robert; Kline, Charles; Thiel, Greg. "The LOCUS distributed operating system," In Proceedings of the 9th Symposium on Operating Systems Principles, Operating Systems Review, ACM, Oct. 1983, pp. 49-69.

Weider, Chris; Strassner, John; Huston, Bob. "LDAP Multi-Master Replication Protocol", Nov. 1997, [17 pages].

*Active Directory LDAP Compliance—White Paper*. Microsoft Corporation, Oct. 2003. pp. 1-16.

Aharoni, Ehud et al. *Restricted Dynamic Steiner Trees for Scalable Multicast in Datagram Networks*. IEEE/ACM Transactions on Networking, vol. 6, No. 3, Jun. 1998, pp. 286-297.

Ajtai, M. et al. *Compactly Encoding Unstructured Inputs with Differential Compression*. Journal of the ACM, vol. 49, No. 3, May 2002, pp. 318-367.

AMD64 Technology. *AMD64 Architecture Programmer's Manual* vol. 3:*General-Purpose and System Instructions*. Advanced Mircro Devices, Sep. 2006, pp. 1-466.

Anderson, Anne. *DCE 1.1 Hierarchical Cells Security Functional Specification*, Draft. Oct. 5, 1993, [15 pages].

Anderson, D and Shanley, T. *Pentium Processor System Architecture*. MindShare, Inc.; Chapters 7, 8, 11, 14-16; Appx. A, D (2d ed., 1995).

Aphelion Directory 2003.2 Administration Guide With: Common DUA Service Module (CDSM) Distributed LDAP Service Module (DLSM), Chapter 10.2 "Multi-master Replication Topology" [online] 2003 [retrieved on Dec. 27, 2007]. Retrieved from the internet: <URL: <http://websolver.us.syntegra.com/support/sw/docs/aphelion2003.2/admin/> (click on "Multi-master Replication Topology").

Bernstein, Philip. *Review: A Majority Consnesus Approach to Concurrency Control for Multiple Copy Databases*. [online]. ACM SIGMOD Digital Review 1, 1999 [retrieved on Dec. 20, 2007]. Retrieved from internet: <URL: http://www.informatik.uni-trier.de/~ley/db/journals/dr/Bernstein99.html>.

Bharath-Kumar, Kadaba et al. *Routing to Multiple Destinations in Computer Networks*. IEEE Transactions on Communication, vol. COM-31, No. 3, Mar. 1983, pp. 343-351.

Birrell, Andrew D.; Hisgen, Andy; Jerian, Chuck, Mann, Timothy and Swart, Garret, *The Echol Distributed File System*. Technical Report 111, Digital Equipment Carp. System Research Center, Sep. 1993, [26 pages].

Bjørner, N. et al. *Content Dependent Chunking for Differential Compression, The Local Maximim Approach*. MSR Technical Report, Dec. 2006, pp. 1-90.

Broder, A.Z. et al. *Syntactic clustering of the Web* [online]. [Retrieved on Sep. 21, 2007] Proceedings of the 6th International Conference on WWW, Sep. 1997, pp. 1-16. Retrieved from: http://www.std.org/msm/common/clustering.html.

Broder, A.Z. *On the resemblance and containment of documents*. Proceedings of the Compression and Complexity of Sequences, Jul. 11-13, 1997, pp. 21-29.

Byte.com. *New Replication Options in Access, Oracle and Notes*. Byte Magazine Article, Oct. 1995, pp. 1-4.

Byte.com. *Notes Replication: Outstanding in Its Field*. Byte Magazine Article, Apr. 1996, pp. 1-3.

Calvert, Kenneth L.; Doar, Matthew B. and Zegura, Ellen W. *Modeling Internet Topology*. IEEE Communications Magazine, 1997, vol. 35, No. 6, pp. 160-163.

*Can I Rename my Windows 2000 Domain*. Petri IT Knowledgebase. [online], [retrieved on Aug. 1, 2007]. Retrieved from the internet: <URL: http://www.petri.co.il/w2k_domain_rename.htm>.

Carter, Robert et al. *Server Selection Using Dynamic Path Characterization in Wide-Area Networks*. IEEE Infocom '97, vol. 3, Apr. 7-12, 1997, pp. 1014-1021.

Chan, M.C. and Woo, T.Y.C. *Cache-based Compaction: A New Technique for Optimizing Web Transfer*. Proc. of the IEEE Infocom Conference, 1999, pp. 117-125.

*Colt 1.2.0*. [online], [retrieved on Dec. 12, 2007]. Retrieved from the internet: <URL: http://dsd.lbl.gov/~hoschek/colt/index.html>.

Concurrency Control [online], [retrieved on Dec. 27, 2007]. Retrieved from the internet: <URL: http://ftp.research.microsoft.com/users/ccontrol/chapter8.pdf>.

Cox, L.P. et al. *Pastiche: Making Backup Cheap and Easy*. 5th Symposium on Operating System Design and Implementation, Dec. 9-11, 2002, pp. 1-15.

*DCE Distributed File System* [online]. [Retrieved Sep. 21, 2007] Wikipedia, pp. 1-2. Retrieved from http://en.wikipedia.org/wiki/DCE_Distributed_File_System.

Dijkstra. *A Note on Two Problems in Connection with Graphs*. Numerische Mathematik, 1959 (Introducing Dijkstra's algorithm).

*Directory Services and Military Messaging* [online], CIT03.03 SEIWG Assessment, Joint Warrior Interoperability Demonstration 2004 Final Report, 2004 [retrieved on Jun. 26, 2007]. Retrieved from the internet: <URL: http://www.cwid.js.mil/public/cwid05fr/htmlfiles/c303sei.html>.

Doar, Matthew B. *A Better Model for Generating Test Networks*. Ascom Nexion, 1996, pp. 1-21.

Droms, R. *Dynamic Host Configuration Protocol*. Bucknell University, IETF RFC 2131, Mar. 1997 [retrieved on Dec. 28, 2007]. Retrieved from the internet: <URL: http://www.ietf.org/rfc/rfc2131.txt>.

eTrust Directory r8 [online], [retrieved on Dec. 28, 2007]. Retrieved from the internet: <URL: http://www.neam.de/uploads/_downloads/etrust_directory_data_sheet.pdf>.

Fetterly, D. et al. *A large-scale study of the evolution of Web pages*. Software—Practice and Experience, vol. 34, No. 2, May 20-24, 2003, pp. 213-237.

Fu, K. and Kaashoek, M.F. *Fast and Secure Distributed Read-Only File System*. ACM Transactions on Computer Systems, vol. 20, No. 1, Feb. 2002, pp. 1-24.

Gligor, Virgil D.; Luan, Shyh-Wei; and Pato, Joseph N. *On Inter-Realm Authentication in Large Distributed Systems*. 1992 IEEE Symposium on Reserach in Security and Privacy, May 4-6, 1992, pp. 2-17.

Gopal, Burra and Udi, Manber. *Integrating Content-based Access Mechanisms with Hierarchical Files Systems*. Proceedings of the 3rd Symposium on Operating Systems Design and Implementation, Feb. 1999, pp. 1-15.

Gray, Jim N. *Notes on Data Base Operating Sytems*. Lecture Notes In Computer Science, vol. 60: Operating Systems, An Advanced Course; 1978, pp. 393-481.

Gray, Jim, et al. *The Dangers of Replication and a Solution*. SIGMOD 1996, Jun. 1996, pp. 173-182.

Gulbrandsen, A., et al. *A DNS RR for Specifying the Location of Services (DNS SRV)*. RFC 2782, Feb. 2000, [12 pages].

Gulbrandsen, A., et al. *A DNS RR for Specifying the Location of Services (DNS SRV)*. RFC 2052, Oct. 1996, [10 pages].

Guy R. G.; Popek, G. J.; Page, Jr., T.W. *Consistency algorithms for optimistic replication*. First IEEE Int'l Conf. on Network Protocols, San Francisco, Cal., 1993.

Guy, Richard D., et al. *Implementation of the Ficus Replicated File System*. USENIX Conference Proceedings, Anaheim, CA, Jun. 1990, pp. 63-71.

Guy Richard G. *Ficus: A Very Large Scale Reliable Distributed File System*. PhD thesis, University of California, Los Angeles (UCLA technical report CSD-910018); Jun. 3, 1991, pp. 1-125.

Gwertzman, J. et al. *The Case for Geographical Push Caching* [online], [retrieved on Dec. 12, 2007]. Retrieved from the internet: <URL: http://citeseer.ist.psu.edu/gwertzman95case.html>.

Haveliwala, T.; Gionis, A. and Indyk, P. *Scalable Techniques for Clustering the Web*. In Proceedings of WebDB, 2000, pp. 1-6.

Heidemann, John S.; Page, Thomas W.; Guy, Richard; and Popek, Gerald J. *Primarily Disconnected Operation: Experiences with Ficus*. Second Workshop on Management of Replicated Data, Nov. 1992, pp. 2-5.

Heintze, N. *Scalable document fingerprinting*. 1996 USENIX Workshop on E-Commerce, Nov. 1996, pp. 1-10.

Holbrook, Hugh et al. *Log-Based Receiver-Reliable Multicast for Distributed Interactive Simulation.* Stanford University, 1995 [retrieved on Dec. 28, 2007]. Retrieved from the internet: <URL: http://cs.ecs.baylor.edu/~donahoo/classes/5321/papers/HSC95.pdf>.

*How to Optimize Active Directory Replication in a Large Network* [online], [retrieved on Jun. 26, 2007]. Retrieved from the internet: <URL: http://support.microsoft.com/kb/244368>.

Huffaker, B., Plummer, D., Moore, D. and Claffy, K. *Topology Discovery by Active Probing.* In Proceedings of 2002, pp. 1-8.

Hunt, J.W. and McIlroy, M.D. *An Algorithm for Differential File Comparison.* Computer Science Technical Report 41, Bell Labs, Jun. 1976, pp. 1-9.

Hunt, J.W. and Szymansky, T.G. *A Fast Algorithm for Computing Longest Common Subsequences.* Communications of the ACM 20(5), May 1977, pp. 350-353.

*IDEAL Migration* [online], Pointdev, Aug. 2000 [retrieved on Mar. 3, 2007]. Retrieved from the internet: <URL: www.pointdev.com>.

*Implementing Database Replication with JRO* [online]. [Retrieved on Jun. 27, 2007] Microsoft Corporation, Jan. 1999, pp. 1-10. Retrieved from : http://msdn2.microsoft.com/en-us/library/aa140026(office.10,d=printer).aspx.

*Information Technology—Open Systems Interconnection—The Directory: Protocol Specifications.* Recommendation X.519, ISO/IEC 9594-5, 1993, pp. 1-42.

*Installing a Coda Server* [online]. File System User and System Administrators Manual, Chapter 7 [retrieved on Jun. 26, 2007]. Retrieved from the internet: <URL: http://coda.planetmirror.com/doc/html/manual/x1243.html>.

*Intel Architecture Software Developer's Manual vol. 1 : Basic Architecture.* Intel Corporation, 1999, pp. 1-369.

*Intel Processor CPUID function (available since 486 processors)6.15.3* [online], Intel Corporation, 1999 [retrieved on Jun. 26, 2007]. Retrieved from the internet: <URL: http://www.intel.com/design/pentiumii/manuals/24319002.pdf>.

*Intel Processor Identification and the CPUID Instruction* [online], Intel Corporation, Mar. 2003 [retrived on Jun. 26, 2007]. Retrieved from the internet: <URL: ftp://download.intel.com/support.processors/procid/2416815.pdf>.

*Intel® Pentium® III Processor—Low Power Module* [online], [retrieved on Dec. 13, 2007]. Retrieved from the internet: <URL: http://www.intel.com/design/support/faq/embed_proces/pentiumiii_lp_mod.htm>.

Irmak, U. and Suel, T. *Hierarchical Substring Caching for Efficient Content Distribution to Low-Bandwidth Clients.* 14th International WWW Conference, May 2005, pp. 1-11.

Irmak, U.; Mihaylov, S. and Suel, T. *Improved Single-Round Protocols for Remote File Synchronization.* IEEE Infocom Conference, Mar. 2005, pp. 1665-1676.

*ITU-T X.500, Section II* [online], International Telecommunication Union, Nov. 1993 [retrieved on Jun. 26, 2007]. Retrieved from the internet: <URL: http://www.itu.org>.

*ITU-T X.525, Section II* [online], International Telecommunication Union, Nov. 1993 [retrived on Jun. 26, 2007]. Retrieved from the internet: <URL: http://www.itu.org>.

Jain, N.; Dahlin, M. and Tewari, R. *TAPER: Tiered Approach for elimiating Redundancy in Replica Synchronization.* 4th Usenix Conference on File and Storage Technology, FAST, 2005, pp. 1-14.

Jenkins, R. *Hash Functions for Hash Table Lookup* [online]. [Retrieved on Sep. 21, 2007] 1995-1997, pp. 1-9. Retrieved from: http://burtleburtle.net/bob/hash.evahash.html.

*JUNG—Java Universal Network/Graph Framework* [online], [retrieved on Dec. 12, 2007]. Retrieved from the internet: <URL: http://jung.sourceforge.net/>.

Kantor, B. and Lapsley, P. *Network News Transfer Protocol: A Proposed Standard for the Stream-Based Transmission of News.* IETF RFC 977, Feb. 1986 [retrieved on Dec. 28, 2007]. Retrieved from the internet: <URL: http://www.ietf.org/rfc/rfc977.txt>.

Kittur, Sunil et al. *Fault Tolerance in a Distributed CHORUS/MiX System* [online]. [Retrieved on Dec. 12, 2007] Retrieved from the internet: <URL: http://www.usenix.org/publications/library/proceedings/sd96/full_papers/kittur.ps>.

Kohn, J. and Neuman, C. *The Kerberos Network Authentication Services (V5).* RFC 1510, Sep. 1993, [105 pages].

Korn, D. et al. *The VCDIFF Generic Differencing and Compression Data Format.* RFC 3284, Jun. 2002, pp. 1-28.

Kulkarni, P. et al. *Redundancy Elimination within Large Collections of Files.* Proceedings of the 2004 USENIX Annual Technical Conference, Boston, MA, Jun. 27-Jul. 2, 2004, pp. 1-15.

Langford, John. *Multifound Rsync.* Unpublished, Jan. 31, 2001. pp. 1-11.

Legg, S. and Payne A. *LDUP Update reconciliation Procedures.* Internet-Draft, Jun. 25, 1999, [28 pages].

*LinkSys PAP2 Router* [online], [retrieved on Dec. 13, 2007]. Retrieved from the internet: <URL: http://www.go2call.com/docs/LinkSysManualConfig.pdf>.

Liskov, Barbara et al. *Replication in the Harp File System.* ACM SIGOPS Operating System Review, vol. 25 No. 5, Oct. 1991, pp. 226-238.

MacDonald, J.P. *File System Support for Delta Compression.* Master's Thesis, UC Berkeley, May 19, 2000, pp. 1-32.

Manber, Udi and Wu, Sun. *GLIMPSE: A Tool to Search Through Entire File Systems.* University of Arizona Technical Report TR 93-34, Oct. 1993, pp. 1-10.

Manber, Udi. *Finding Similar Files in a Large File System.* Technical Report TR 93-33, Department of Computer Science, Univ. of Arizona, Tucson, Oct. 1993, pp. 1-10.

Merkle, R.C. *A Digital Signature Based on a Conventional Encryption Function.* In A Conference on the Theory and Applications of Cryptographic Techniques on Advances in Cryptology, 1987. pp. 369-378.

Merrells, J. et al. *LDAP Replication Architecture.* IETF draft, Aug. 5, 1998, pp. 1-31.

Minasi, Mark et al. *Mastering Windows Server 2003*, 2003, pp. 503-504.

Mokapetris, R. *Domain Names—Concepts and Facilities.* RFC 1034, Nov. 1987, pp. 1-52.

Moy, John. *The OSPF Specification.* RFC 1131, 1989, [107 pages].

Muthitacharoen, A.; Chen, B. and Mazières, D. *A Low-bandwidth Network File System.* Proceedings of the 18th SOSP, Banff, Canada, Oct. 2001, pp. 174-187.

*NetIQ Migration Suite* [online]. *Net IQ, Solutions from Attachmate, 2000* [retrieved on Mar. 3, 2007]. Retrieved from the internet: <URL:www.netiq.com>.

Neufeld, G. and Gerald, B. *Support for Transactions and Replication in the EAN Directory Service* [online], Dept. of Computer Science, University of British Columbia, [retrieved on Jun. 26, 2007]. Retrieved from the internet: <URL: http://www.dss.bc.ca/dss/tech/papers/ulpas94/ulpaa94.ps.gz>.

*Novell Cluster Services for NetWare 5.1* [online], [retrieved on Dec. 14, 2007]. Retrieved from the internet: <URL: http://www.novell.com/products/clusters/ncs101/details.html>.

*Novell Directory Services*—White Paper. Novell, 1993, pp. 1-8.

*Novell eDirectory v. Microsoft Active Directory.* Competitive white paper, Novell [online], [retrieved on Dec. 27, 2007]. Retrieved from the internet: <URL: http://www.novell.com/collateral/4621396/4621396.pdf> .

*Novell Introduces NetWare Cluster Services for NetWare 5* [online], [retrieved on Dec. 17, 2007]. Retrieved from the internet: <URL: http://www.hpcwire.com/archives/16286.html>.

Novell's eDirectory, "Partitions" [online], [retrieved on Dec. 28, 2007]. Retrieved from the internet: <URL: http://www.novell.com/documentation/edir871/index.html?page=/documentation/edir/871/edir871/data/fbachabc.html>.

*Novell's Nterprise Branch Office Product* [online], [retrieved on Dec. 28, 2007]. Retrieved from the internet: <URL: http://support.novell.com/techcenter/articles/ana20021101.html>.

Ogier, Richard et al. *A Distributed Algorithm for Finding Shortest Pairs of Disjoint Paths.* IEEE Infocom '89, vol. 1, 1989, pp. 173-182.

Oracle's SQL-based products, [online] referenced at http://msdn2.microsoft.com/en-us/library/ms151176(printer).aspx. [retrieved on Jan. 3, 2008]. Retrieved from the internet: <URL: http://msdn2.microsoft.com/en-us/library/ms151176(printer).aspx>.

*OSF 1: OSF™ DCE Application Development Guide*, Version 1.0, Prentice-Hall, 1993.

Parr, G., *A More Fault Tolerant Approach to Address Resolution for Multi-LAN System of Ethernets*. Network Working Group, RFC 1029, May 1988 [retrieved on Dec. 26, 2007]. Retrieved from the internet: <URL: http://www.ietf.org/rfc/rfc1029.txt>.

Pato, J. *Hierarchical Trust Relationship for Inter-Cell Authentication* [online], [retieved on Dec. 12, 2007]. Retrieved from the internet: <URL: http://www.opengroup.org/tech/rfc/mirror-rfc/rfc7.0.txt>.

Paxson, Vern. *End-to-End Routing Behavior in the Internet*. IEEE/ACM Transactions on Networking 5(5), Oct. 1997, pp. 601-615.

Percival, Colin. *Naïve Differences of Executable Code*. Unpublished Draft Paper, pp. 1-3.

Petersen, Karin; Spreitzer, Mike; Terry, Douglas; and Theimer, Marvin. *Bayou: Replicated Database Services for World-wide Appplications*. Computer Science Laboratory, Zerox Palo Alto Research Center, 1996, [6 pages].

Pierce, Benjamin. *Harmony: The Art of Reconciliation* [online], [retrieved on Dec. 28, 2007]. Retrieved from the internet: <URL:http://www.cis.upenn.edu/~bcpierce/papers/harmony-tgx-talk-2005.pdf>.

Polsson, K. *Chronology of Microprocessors 1990* [online], 2006-2007, last updated Apr. 10, 2007 [retrieved on Jun. 26, 2007]. Retrieved from the internet: <URL:http://www.islandnet.com/~kpolsson/micropro/proc1990.htm>.

Quinlan, S. and Dorward, S. Venti: *A New Approach to Archival Storage*. Proceedings of the FAST 2002 Conference on File and Storage Technologies, Jan. 2002, pp. 1-13.

Rabin, Michael. *Fingerprinting by Random Polynomials*. Report TR-15-81, Center for Research in Computing Technology, Harvard University, 1981, pp. 1-14.

Rekhter, Y et al. *Border Gateway Protocol 4 (BGP-4)*. RFC 1771, Mar. 1995, pp. 1-54.

*Royalty-Free CIFS Technical Reference License Agreement*. CIFS Protocol, Microsoft [online], [retrieved on Dec. 28, 2007]. Retrieved from the internet: <URL: http://msdn2.microsoft.com/en-us/library/aa302242.aspx>.

Ryan, V. et al. *Schema for Representing Java™ Objects in a LDAP Directory*. IETF RFC 2713, Oct. 1999. [retrieved on Dec. 28, 2007]. Retrieved from the internet: <URL: http://www.ietf.org/rfc/rfc2713.txt.>.

Saito, Yasushi and Shapito, Marc. *Optimistic Replication*. ACM Computing Surveys 37(1), 42-81, Mar. 2005.

Saito, Yasushi. *Consistency Management in Optimistic Replication Algorithms*. Jun. 15, 2001 [retrieved on Dec. 28, 2007]. Retrieved from the internet:<URL: http://www.ysaito.com/replica.pdf>.

Sarin. Sunl K. and Lynch, Nancy A. *Discarding Obsolete Information in a Replicated Database System*. IEEE, Jan. 1987, pp. 39-47.

Schleimer, S. et al. *Winnowing: Local Algorithms for Document Fingerprinting*. Proceedings of the 2003 ACM SIGMOD International Conference on Management of Data, Jun. 9-12, 2003, pp. 76-85, 2003.

Shukla, Prashant. *Introduction to Novell Replication Services* [online], [retrieved on Dec. 14, 2007]. Retrieved from the internet: <URL: http://support.novell.com/techcenter/articles/dnd19970802.html>.

Sidhu, D., et al. *Finding Disjoint Paths in Networks*. 1991 ACM.

Siegel, Alex et al. *Deceit: A Flexible Distributed File System*. Cornell University Technical Report TR89-1042, Dec. 1989, pp. 1-34.

*Solaris ONC+, Network Information Service Plus (NIS+): an Enterprise Naming Service* [online], Sun, [retrieved on Dec. 26, 2007]. Retrieved from the internet: <URL: http://www.sun.com/software/whitepapers/wp-nisplus/>.

Sonntag, Sussann et al. *Adaptability Using Reflection*. In Proceedings of the Twenty-Seventh Hawaii International Conference on System Science, 1994, pp. 383-392.

Srinivasan, V. and Mogus, J. *Spritely NFS: Experiments with and Implementation of Cache-Consistency Protocols*, Chapter6.2 "Delaying the SNFS close operation." Research Report 89/5, Digital Equipment Corporation, Mar. 1989 [online], [retrieved on Dec. 28, 2007]. Retrieved from the internet: <URL: http://www.hpl.hp.com/techreports/Compaq-DEC/WRL-89-5.pdf>.

Stokes, E., et al., *Lightweight Directory Access Protocol (version 3) Replication Requirements*. IETF RFC 3384, Oct. 2002 [retrieved on Dec. 26, 2007]. Retrieved from the internet: :<URL: http://ietf.org/rfc/rfc3384.txt>.

Suel, T.; Noel, P. and Trendafilov, D. *Improved File Synchronization Techniques for Maintaining Large Replicated Collections over Slow Networks*. IEEE International Conference on Data Engineering, Mar. 2004, pp.1-12.

Swafford, Steven. *CodeSnip: Enforcing Unique Password Strength in an Oracle Database Based Upon a Role* [online], [retrieved on Dec. 13, 2007]. Retrieved from the internet: <URL: http://aspalliance.com/articleViewer.aspx?ald=746&pld=-1>.

*System Administration Guide: Naming and Directory Service (NIS+)* [online], 1994-2007 [retrieved on Jun. 26, 2007]. Retrieved from the internet: <URL: http://docs.sun.com/app/docs/doc816-4558>.

Teodosiu, Dan et al. *Optimizing File Replication over Limited-Bandwidth Networks using Remote Differential Compression*. MSR-TR-2006-157, pp. 1-16.

*The Administrative Authority Model*. Chapter 10 of the X.501 Standard, Nov. 1993, pp. 1-165.

*The History of Notes and Domino* [online]. [Retrieved on Sep. 21, 2007] DeveloperWorks Lotus, Web Team, IBM, Dec. 20, 2005, pp. 1-24. Retrieved from: http://www.ibm.com/developerworks/lotus/library/ls-NDHistory/>.

The Open Group. DCE 1.1: Remote Procedure Call. C706, Oct. 1997, [748 pages].

Thomas, Rboert H. *A Majority Consensus Approach to Concurrency Control for Multiple Copy Databases*. ACM Transactions on Database Systems, vol. 4, No. 2, Jun. 1979, pp. 180-209.

*Transmission Control Protocol, Darpa Internet Program, Protocol Specification*. Information Sciences Institute, IETF RFC 793, Sep. 1981, [91 pages][retrieved on Dec. 28, 2007]. Retrieved from the internet:<URL: http://www/ietf.org/rfc/rfc793.txt>.

Trendafilov, D; Memon, N. and Suel, T. Zdelta: *An Efficient Delta Compression Tool*. Technical Report TR-CIS-2002-02, Polytechnic University, Jun. 26, 2002, pp. 1-14.

Tridgell, Andrew and Mackerras, Paul. *The Rsync Algotithm*. Technical Report TR-CS-96-05, Australian National University, Jun. 1996, pp. 1-6.

Tridgell, Andrew. *Efficient Algorithms for Sorting and Synchronization*. PhD Thesis, Australian National University, Feb. 1999, pp. 1-106.

*Understanding X.500—The Directory* [online], [retrieved on Dec. 13, 2007]. Retrieced from the internet: <Url: http://sec.cs.kent.ac.uk/x500book/>.

*University of Oregon Route Views Project*. Advanced Network Technology Center [online], University of Oregon, [retrieved on Jun. 26, 2007]. Retrieved from the internet: <URL: http://www.routeviews.org/2001>.

*Using Server Failover* [online], 2001 [retrieved on Jun. 26, 2007]. Retrieved from the internet: <URL: http://livedocs.macromedia.com/coldfusion/5.0/Advanced_ColdFusion_Administration/optimize3.htm>.

Veizades, J., et al. *Service Location Protocol*. IETF RFC 2165, Jun. 1997, [67 pages]. [retrieved on Dec. 28, 2007]. Retrieved from the internet: : <URL: http://www.ietf.org/rfc/rfc2165.txt>.

Wang, Randolph Y., and Anderson, Thomas E. *xFS: A Wide Area Mass Storage File System*. Computer Science Division, University of California, Dec. 1993, pp. 1-8.

Weiser, Russel F. and Strokes, Ellen. *LDAP V3 Replication Requirements*. Internet Draft, Feb. 19, 1999, [15 pages].

*Which Directory Offers the Best LDAP Server?* White paper, Novell [retrieved on Dec. 28, 2007]. Retrieved from the internet: <URL: http://www.novell.com/info/collateral/docs/4621218.01/4621218.pdf>.

*Why is there a /vice/db/servers file?*, Coda File System [online], [retrieved on Jun. 26, 2007]. Retrieved from the internet: <URL: http://www.coda.cs.cmu.edu/misc/vice-db-servers.html>.

Wolfson, Ouri and Milo, Amir. *The Multicast Policy an dits Relationship to Replicated Data Placement*. 1991, pp. 181-205.

Wong, K.C. et al. *Directory Replication in Distributed Systems*. In The Proceedings of the first annual Workshop for the ACM Special Interest Group on Forth—SIFGorth '89, 1989, pp. 123-127.

*X.500 and DAP* [online], [retrieved on Jun. 26, 2007]. Retrieved from the internet: <URL: http://www.itu.int/rec/T-Rec-X.500-199708-S/en>.

*X.500 and LDAP* [online], [retrieved on Jun. 26, 2007]. Retrieved from the internet: <URL: http://www.collectionscanada.ca/iso/ill.document/ill_directory/X_500andLDAP.pdf>.

X.500, [online] reference at http://java.sun.com/products/jndi/tutorial/ldap/models/x500.html. [retrieved on Jan. 2, 2008]. Retrieved from the internet: <URL: http://java.sun.com/products/jndi/tutorial/ldap/models/x500.html.

*Xerces Java Parser 1.4.4* [online], [retrieved on Dec. 14, 2007]. Retrieved from the internet: <URL: http://xerces.apache.org/xerces-j/>.

*Xerox PARC's Bayou Project* [online], last editied Jun. 25, 1999 [retrieved on Jun. 26, 2007]. Retrieved from the internet: <URL: http://www.2.parc.com/csl/projects.bayou/>.

Xiong, Ming et al. *MIRROR: A State-Conscious Concurrency Control Protocol for Replicated Real-time Databases*. IEEE Electron Devices Society 1990 Solid-State Sensor and Actuator Workshop, Hilton Head Island, SC, Jun. 4-7, 1990, pp. 20-29.

Zegura, Ellen W., Calvert, Kenneth L. and Bhattacharjee, Samrat. *How to Model an Internetwork*. IEEE Infocorn, Mar. 24-28, 1996, pp. 594-602.

Zeilenga, K. *Named Subordinate References in Lightweight Directory Access Protocol (LDAP) Directories*. RFC 3296, Jul. 2002, [14 pages] [retrieved on Dec. 28, 2007].Retrieved from the internet: : <URL: htto://www.ietf.org/rfc/rfc3296.txt>.

Zhou, Wanlei et al. *Distributed Object Replication in a Cluster of Workstations*. IEEE 2000, May 14-17, 2000, pp. 889-894.

E. Stokes et al., The LDUP Replication Update Protocol. Internet-Draft draft-ietf-ldup-protocol-03.txt (Work in Progress). Internet Engineering Task Force, Nov. 2001.

* cited by examiner

| SERVER ID | UPDATE SERIAL NUMBER (USN) | LAST SUCCESSFUL REPLICATION TIMESTAMP (LSRT) |
|---|---|---|
| $S_1$ | 37 | 2001/11/12, 11:47 p.m. |
| $S_2$ | 202 | 2001/11/13, 10:02 a.m. |
| $S_3$ | 76 | 2001/11/13, 10:31 a.m. |
| $S_4$ | 64 | 2001/11/13, 06:03 a.m. |
| $S_5$ | 189 | 2001/11/13, 08:58 a.m. |
| $S_6$ | 101 | 2001/11/13, 02:34 a.m. |

FIG. 5a

| SERVER ID | UPDATE SERIAL NUMBER (USN) | LAST SUCCESSFUL REPLICATION TIMESTAMP (LSRT) |
|---|---|---|
| $S_1$ | 37 | 2001/11/12, 11:47 p.m. |
| $S_2$ | 202 | 2001/11/13, 10:02 a.m. |
| $S_3$ | 76 | 2001/11/13, 11:11 a.m. |
| $S_4$ | 65 | 2001/11/13, 10:29 a.m. |
| $S_5$ | 189 | 2001/11/13, 08:58 a.m. |
| $S_6$ | 101 | 2001/11/13, 02:34 a.m. |

FIG. 5b

NON-INVASIVE LATENCY MONITORING IN A STORE-AND-FORWARD REPLICATION SYSTEM

RELATED APPLICATION

This application is a continuation of prior, co-pending U.S. patent application for "NON-INVASIVE LATENCY MONITORING IN A STORE-AND-FORWARD REPLICATION SYSTEM," filed on Nov. 27, 2001 and assigned Ser. No. 09/995,121, and issued as U.S. Pat. No. 7,035,922 on Apr. 25, 2006, the complete disclosure of which is hereby incorporated by reference in its entirety.

AREA OF THE INVENTION

The invention relates generally to the transmission of data to multiple computers in a computer network and, more particularly, to a method of monitoring data updates in complex replicated systems.

BACKGROUND OF INVENTION

In the field of computer networking, many efforts have been made to develop the most efficient and reliable way for servers within a computer network to communicate updates with one another. In particular, the problem of monitoring the status of servers and server updates has been challenged given that most conventional network database systems often contain multiple servers that are geographically dispersed. "Updates" are generally modifications to data objects or attributes of data objects within the distribute database. Because copies of the data objects may exist on several servers, any modification made to an object of a database on one of the servers must be propagated to all other copies of the object in the system such that updated objects at the various servers reflect the modification.

In order to keep the data objects maintained by each server current, updates made by one server are "replicated" to all other servers of the database system by a process called "replication." During replication, a "source" server sends data to a "destination" server, updates being replicated may have originated on the source server or on another server in the system. A server on which a modification to an object is initially made, rather than an update received through a replication, is referred to as an "originating" server. Ultimately, the goal is to replicate an update message to all servers in the system that require updated object information.

Several techniques have been developed to effectuate replication in a network. One such technique is applicable in a simple replicated system, whereby a smaller number of servers holding the replicated data, referred to as "replicas" or "replica servers," can be directly connected to all servers (or, as an optimization, all read/write (or master) replicas). This technique, referred to as "full-mesh replication," operates in a manner such that as an update is originated on one replica, that replica then sends the update directly to every other replica. According to this technique, if there are N replicas, each replica in a full-mesh system has N−1 inbound communication paths and N−1 outbound communication paths. The network that connects the replicas must sustain all of the order $N^2$ communication paths. At some value N, however, the load on the individual replica servers and/or on the network becomes too great to effectively sustain full-mesh replication.

Consequently, reducing the load requires a reduction in the number of overall communication paths between servers. A workable solution calls for a model that does not require direct connections between all replica servers. One technique, referred to as "store-and-forward replication," overcomes the loading problem associated with full-mesh replication by allowing an update to originate on server A, replicate to server B, and then replicate from server B to server C. This method, wherein an update can flow through intermediary replicas, does not require a connection between destination server C and originating server A.

Compounding the problem of replication, however, is the fact that replica servers are prone to failure. Failures can be due to a number of problems including network errors, hardware problems, server or network misconfiguration, etc. Some failures result from the situation where the replica server is simply not functioning. In that instance, other servers that query the non-functioning server for information will realize that the server is not operational. Other failures, however, result from the situation where the replica server is functioning but not receiving updates originating from other replica servers. In this more troubling situation, clients that contact a replica server in such a state receive increasingly outdated data until the failure is fixed or the replica server is taken offline. In the meantime, the effects of the outdated data can be subtle. For example, an address book might report an old phone number for a contact. These subtle effects might go unnoticed for a long period of time, during which the amount of data that needs to be replicated to the failed replica server continues to grow as does the amount of time it will take to bring the replica server up-to-date once the failure has been identified and corrected. Thus, most replica systems provide some form of service feature to monitor replica servers so that failures preventing replication can be identified and thereafter rectified.

Monitoring the replication state of a replica server in a full-mesh system is typically easy. Because each server communicates with all other servers directly, each replica server maintains state information about which updates it has successfully sent or received to or from each other replica server. This information, referred to as the "direct replica partner state," contains timestamps used to evaluate the integrity of the data. For example, the timestamp represents the time of the last successful replication or the time of the last replication attempt. The direct replica partner state, thus, can be queried by an administrator or monitoring tool to determine if replication is functioning properly. Unfortunately, replication monitoring of a full-mesh system becomes an impractical solution for the reason that directly querying all servers in a system is impractical.

Monitoring the replication state of a replica server in a store-and-forward replication system, however, is more difficult. The direct replica partner state, which by definition does not include information about replica servers that are not direct partners, yields only a partial view of the quality of the data replicated inbound or outbound from a given replica server. For example, if server A replicates to/from only server B and server B replicates to/from only server C, then examining server C alone would not provide the administrator with any information regarding how current the data on server C is with respect to the data on server A.

Another method for monitoring the health of store-and-forward systems, employed by Microsoft's Operations Manager, requires each replica server to originate an artificial update referred to as a "heartbeat." This update is made solely for the benefit of monitoring the replication system. If all replicas are originating artificial updates—which is as simple as writing the current time on data related to that replica server—then any given replica server can examine its local copy of the data, which includes the data being written by all other replica servers, to determine the last update it received from every other replica server. If the last update it received originated at some time in the past beyond what is expected, then action is taken to inform an administrator to investigate the server failure. One problem with this self-monitoring approach is that it requires the data corresponding to each replica server to be updated periodically, often with a period less than the maximum latency tolerated between replica servers, in order to be monitored. As such, the origination and replication of these write messages can be very expensive.

As the number of replica servers in the replication system grows, the complexity of determining how current any given replica server is with respect to all other replica servers grows very quickly, both in terms of the number of servers that must be queried and in determining which servers must be queried. In view of the foregoing, it can be seen that there is a need for a method for proactively monitoring replica servers to ensure that failures preventing replication are addressed and rectified in a timely and efficient manner.

SUMMARY OF THE INVENTION

The present invention is directed to a method for monitoring replica servers to ensure that failures preventing replication of object updates are identified and rectified in a timely and efficient manner.

According to aspects of the present invention, a networked computer system comprises a plurality of servers connected by data links. Each server in the networked computer system periodically replicates object updates from another server in the system during replication. Associated with each server in the networked computer system is a replica partner vector table that includes relevant information about all servers in the system. In particular, each server maintains an independent, monotonically increasing update sequence number (USN) that it associates with each update it originates. The (originating server ID, USN) pair associated with each update is replicated along with the updated data. The replica partner vector table is made up of a number of (originating server ID, USN) pairs. Each such pair is an assertion that this server has applied all updates originated by the server corresponding to the originating server ID at or before the given USN. These assertions are communicated to other servers during replication to avoid replicating updates to a server if the server has already received and applied them. As such, other servers in the system use the pair to identify the current state of their own object data.

The replica partner vector table also includes timestamp information that identifies the time of its last update and the last successful replication attempt for each replica server in the system, regardless of whether the replica communicated an update to that replica directly. Thus, each replica maintains information about its direct and indirect partners such that the state of indirect partners flows through the direct partners.

During the replication process, a server transmits its replica partner vector table to the replica server. The replica server then compares its own replica partner vector table with the replica partner vector table it receives from the server. By comparing the USN and the timestamp, the replica server can determine what updates the server is missing. Thereafter, the replica server transmits the missing object updates in addition to the new USNs and timestamps. After receiving the object updates, the server updates its own replica partner vector table to include the new USNs and timestamps.

A monitoring tool running at each server, separate from the replication process, evaluates the USN and timestamp entries in the replica partner vector table. As part of the monitoring process, all timestamps are compared to the current time to determine when the last successful replication attempt occurred. If the time of the last successful replication attempt as compared to the current time exceeds an acceptable latency period, an alert is generated whereby users and/or a network administrator are informed of the problem.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 5a-5b depict exemplary replica partner vector tables, illustrating updates thereto, in accordance with the present invention;

DETAILED DESCRIPTION OF ILLUSTRATIVE EMBODIMENTS

Although it is not required, the present invention may be implemented by program modules that are executed by a computer. Generally, program modules include routines, objects, components, data structures and the like that perform particular tasks or implement particular abstract data types. A program may include one or more program modules. The invention may be implemented on a variety of types of computers, including personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
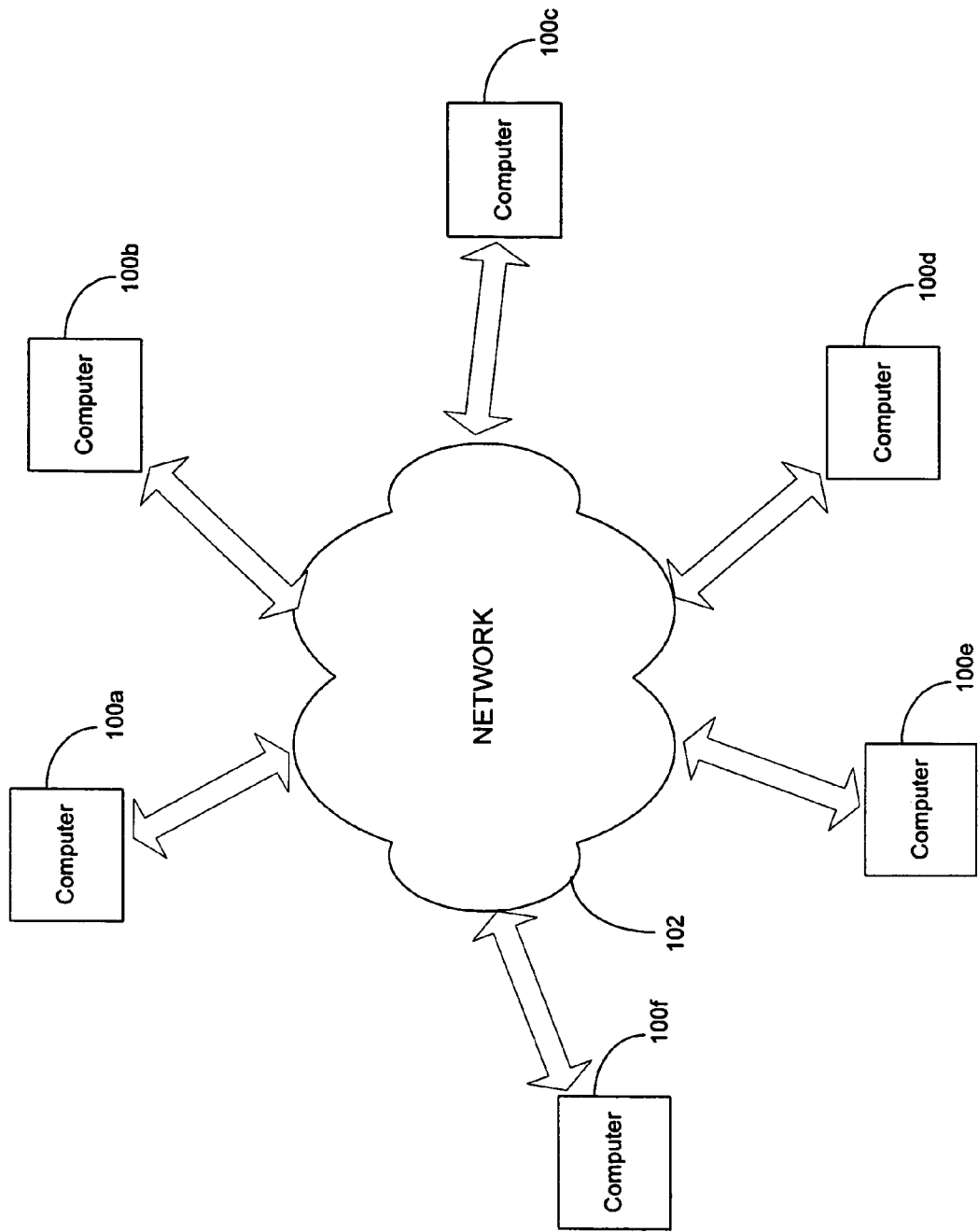
FIG. 1 is an example of a networked computer system in which aspects of the present invention and/or portions thereof may be incorporated.

An example of a networked environment in which this system may be used will now be described with reference to FIG. 1. The example network includes several computers 100a-f communicating with one another over a network 102, represented as a cloud. Network 102 may include any of many well-known components, such as routers, gateways, hubs, etc. and may allow computers 100a-f to communicate via wired and/or wireless media.

Figure 2:
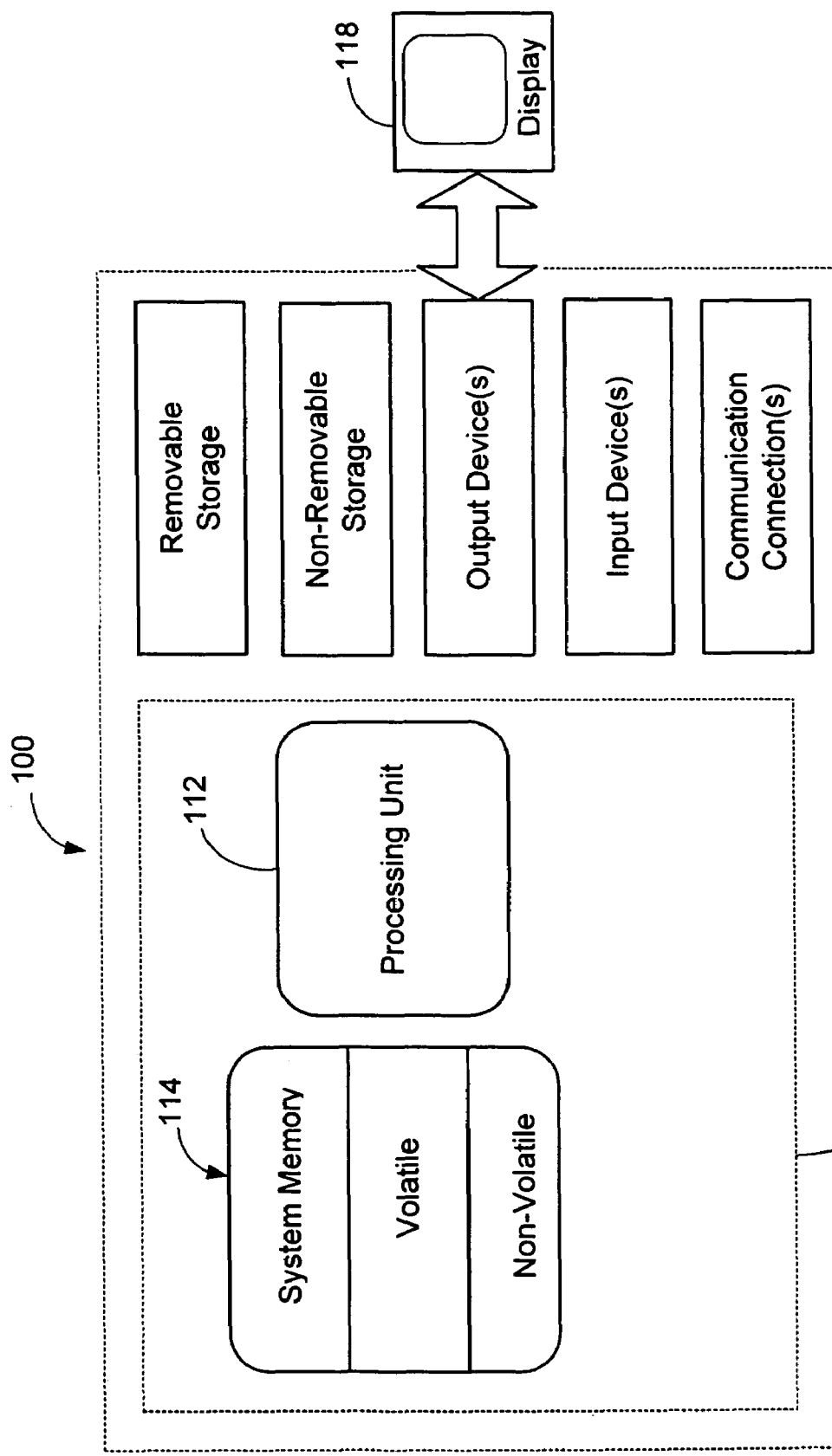
FIG. 2 is a block diagram of a general purpose computer in which aspects of the present invention and/or portions thereof may be incorporated.

Referring to FIG. 2, an example of a basic configuration for a computer on which the system described herein may be implemented is shown. In its most basic configuration, computers 100a-f typically include at least one processing unit 112 and memory 114. Depending on the exact configuration and type of the computer, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computers 100a-f may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by computers 100a-f. Any such computer storage media may be part of computers 100a-f.

Computers 100a-f may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computers 100a-f may also have input devices such as a keyboard, mouse, pen, voice input device, touch input device, etc. Output devices such as a display 116, speakers, a printer, etc. may also be included. All these devices are well known in the art and need not be discussed at length here.

Figure 3:
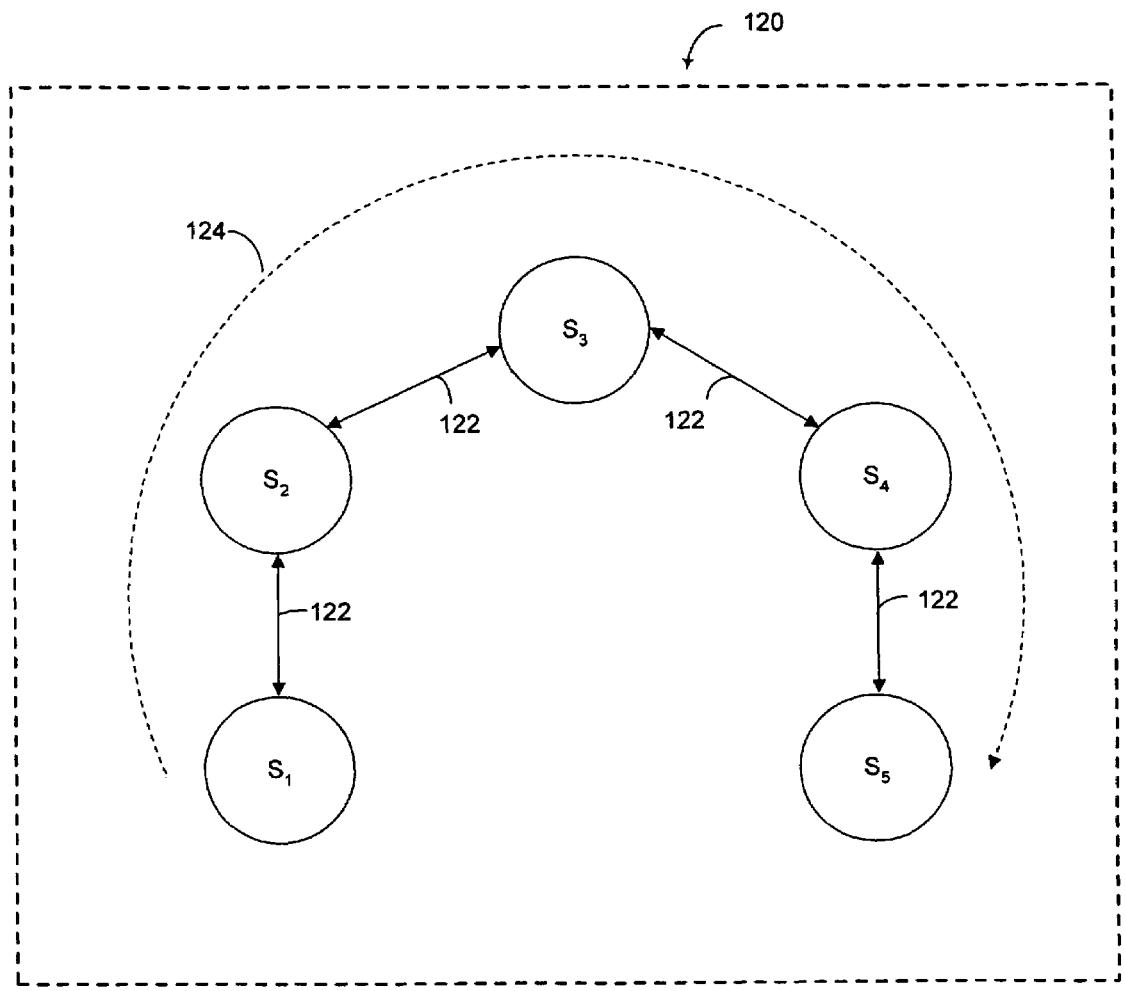
FIG. 3 depicts an exemplary networked computer system with several servers implementing store-and-forward replication with one replication path.

FIG. 3 depicts an exemplary networked computer system with several servers. As shown in FIG. 3, the computer system 120 includes a plurality of servers (referenced as $S_1$, $S_2$, $S_3$, $S_4$, and $S_5$) interconnected by data links 122. The servers may be any appropriate server, for example, a central server or a client server. Any server is employed in various embodiments of the present invention. The data links 122 comprise any appropriate data link, for example, a local area network, a wide area network, or the Internet. Various data links are employed in alternative embodiments of the invention. Servers and data links are generally known to the relevant public and therefore need not be described herein in any detail. Furthermore, as is known in the industry, conventional networked computer systems contain large numbers of distributed servers interconnected by varied data links.

As shown in FIG. 3, the computer system 120 implements store-and-forward replication with one replication path 124. As is typical in a store-and-forward replication system, each replica server is directly connected to a number of other replica servers such that each server receives "direct updates" from its "direct partners." For example, $S_3$ receives direct updates from its two direct partners, $S_2$ and $S_4$. Similarly, each server receives "indirect updates" from each "indirect partner" in the replication system. This method allows indirect updates from a "source server" to flow through direct partners and arrive at the "destination server." For example, server $S_5$ receives indirect updates from indirect partner $S_1$ by way of replica servers $S_2$, $S_3$ and $S_4$. In other words, an update message is sent along path 124 from server $S_1$ to server $S_5$. Of course, if any server along path 124 is not functioning, the update message will not arrive at destination server $S_5$.

Figure 4:
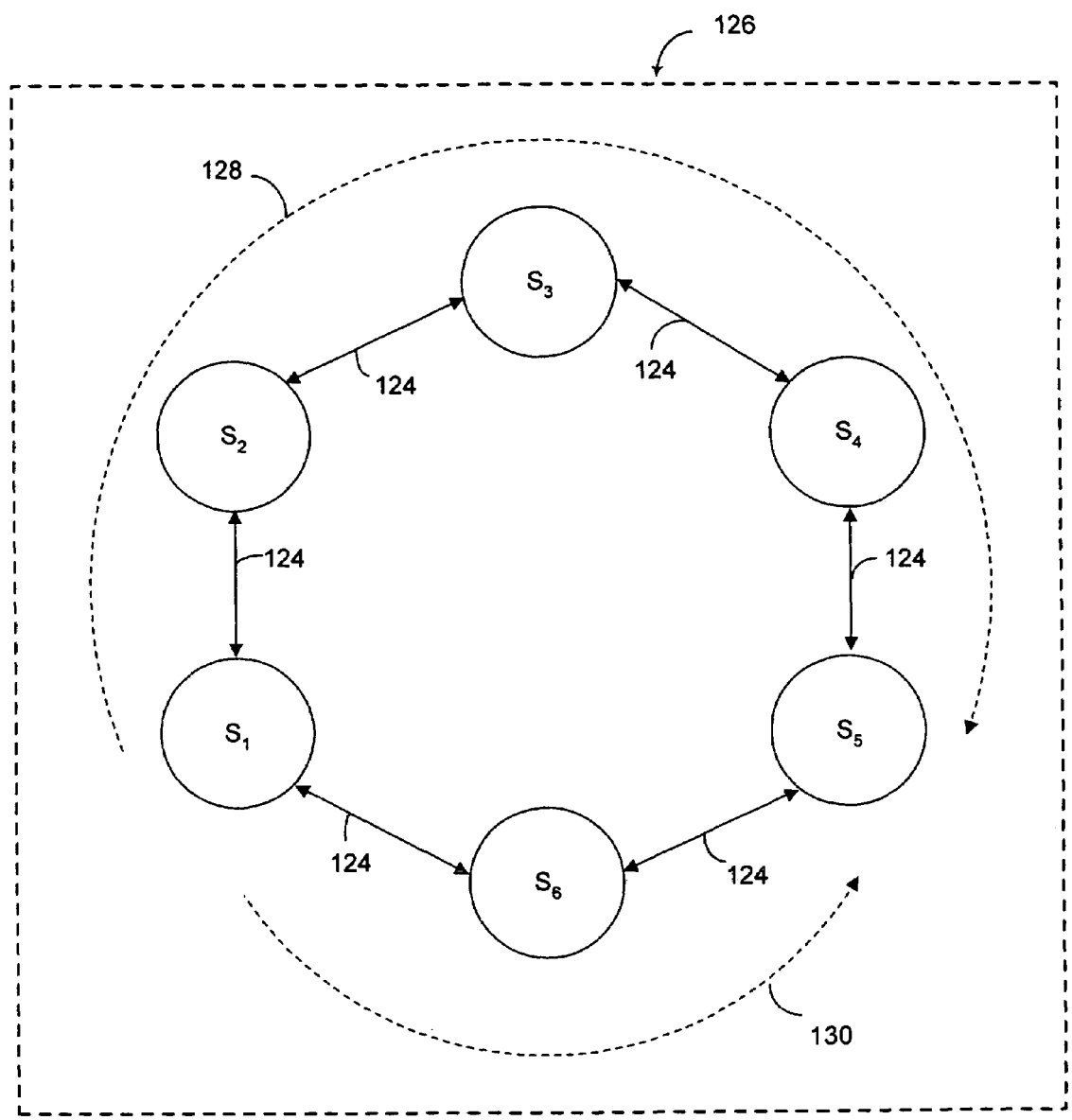
FIG. 4 depicts an exemplary networked computer system with several servers implementing store-and-forward replication with multiple replication paths.

To avoid this problem, conventional store-and-forward systems include multiple replication paths. FIG. 4 depicts a simple store-and forward replication system 126 with two replication paths 128, 130. In this example, an update message forwarded by source server $S_1$ to destination server $S_5$ takes one of two paths. According to one path 128, the update message from source server $S_1$ is sent through indirect partners $S_2$ and $S_3$, serially, and then on to direct partner $S_4$ which finally forwards the update to destination server $S_5$. The other path 130 requires that the update message generated by source server $S_1$ be sent to $S_6$. Server $S_6$, a direct partner of $S_5$, then sends the update on to destination server $S_5$. Because the replication system contains multiple replication paths, a single, non-functioning server does not prevent an update message from arriving at the destination server.

Of course, in order for this replication method to operate effectively, each replica server in a replication system contains information about both its direct partners and indirect partners. This information kept by the replica server is referred to as the "replica partner state." According to an exemplary embodiment of the invention, replica servers represent the replica state for all replica server partners, both direct and indirect, as a "replica partner vector." Each entry in the replica partner vector table corresponds to exactly one replica server such that the replica partner vector represents the entirety of a given replica server's knowledge of its replication state with respect to all other replica servers in the networked computer system.

According to one aspect of the exemplary embodiment of the invention, replica servers in the replication system have a replica partner vector table associated with it. Depicted in FIG. 5a is an exemplary replica partner vector table 132 representing the replica partner state for server $S_3$ shown in FIG. 4. The replica partner vector 132 includes a data field 134 corresponding to each replica server in the replication system 126. For example, replica partner vector table 132 includes references to $S_1$, $S_2$, $S_3$, $S_4$, $S_5$, and $S_6$. Alternatively, server $S_3$ includes references in its vector table to all servers except the reference relating to its own state, which is then stored separately.

Each replica server representation in the replica partner vector table 132 includes a data field 136 representing an update sequence number (USN). According to an embodiment of the invention, the USN is a serial number assigned sequentially to each update recorded by the replica server. For example, as shown in FIG. 5a, the replica partner state of $S_3$ indicates that $S_3$ is current up to a USN value 37 for $S_1$, a USN value 202 for $S_2$, a USN value 64 for $S_4$, a USN value 189 for $S_5$, and a USN value 101 for $S_6$. An implementation example of such a USN is found in the MICROSOFT ACTIVE DIRECTORY service (a product of Microsoft Corp. of Redmond, Wash.).

Each replica server representation in the replica partner vector table 132 includes a data field 138 representing a timestamp referred to as the "last successful replication timestamp" (LSRT). The LSRT for any replica server specifies the last time at which a successful replication attempt was made by that replica server. According to one aspect of the invention, at the end of a successful replication attempt, the LSRT will be posted regardless of whether any updates were replicated from server to server. Importantly, for purposes of monitoring servers within a networked computer system, this method provides a way to differentiate between a functioning server with no updates and a non-functioning server incapable of replicating its update information.

Thus, USN data field 134 and LSRT data field 138, together, provide information on both the status of the server and objects updates at the server. For example, as demonstrated in replica partner vector table 132 shown in FIG. 5a, server $S_3$ replicated object updates for all servers in the computer system including server $S_4$. In particular, data field 136 indicates that $S_3$ is current up to a USN value 64 for server $S_4$ and data field 138 indicates that the last successful replication attempt for data relating to server $S_4$ occurred on Nov. 13, 2001 at 06:03 a.m. The LSRT may be any appropriate absolute representation of time capable of comparison, for example, 2001 Nov. 13 or 11132001. What is known from the replica partner state data at server $S_3$ is that server $S_3$ received updates relating to server $S_4$ from another server in the computer system 126 either directly from server $S_4$ or indirectly from another server. What is not known is whether a USN value 64 corresponds to the most up-to-date information at server $S_4$. As is typical in a replication system, server $S_3$ will continue to replicate updates with its replica partners such that it will receive any updates subsequent to a USN value 64 from server $S_4$.

For example, if server $S_4$ posts an update having a USN value equal to 65 and server $S_3$ replicates the update, then the replica partner vector table 132 of server $S_3$ will reflect the new replica partner state. FIG. 5b depicts server $S_3$'s replica partner vector table 140 with data field 142 corresponding to each replica server in the replication system 126, data field 144 representing the USN of each update, and data field 146 representing the LSRT. FIG. 5b shows the replica partner state after an update having a USN value 65 is replicated to server $S_3$. In particular, data field 144 indicates that $S_3$ is current up to a USN value 65 for server $S_4$ and data field 146 indicates that the last successful replication attempt for data relating to server $S_4$ occurred on Nov. 13, 2001 at 10:29 a.m. Also shown in FIG. 5b, servers $S_1$, $S_2$, $S_5$ and $S_6$ did not replicate object updates to $S_3$ because $S_3$ was already up-to-date with all object updates as indicated by the USN and LSRT.

According to another aspect of an exemplary embodiment of the invention, the server requesting replication transmits its replica partner vector table to the other server. The server requesting replication is referred to as the "local" server and the server being queried is referred to as the "remote" server. To facilitate replication, the remote server, upon receiving the replica partner vector table from the local server, compares the replica partner vector table from the local server to its own replica partner vector table. By comparing the USN and LSRT for each entry in the replica partner vector table, the remote server determines whether any object updates need to be replicated to the local replica server. Thereafter, any object updates or timestamp updates are replicated (i.e., transmitted) to the local server, after which, the local server improves its own replica partner vector table to reflect the replication updates.

Figure 6A:
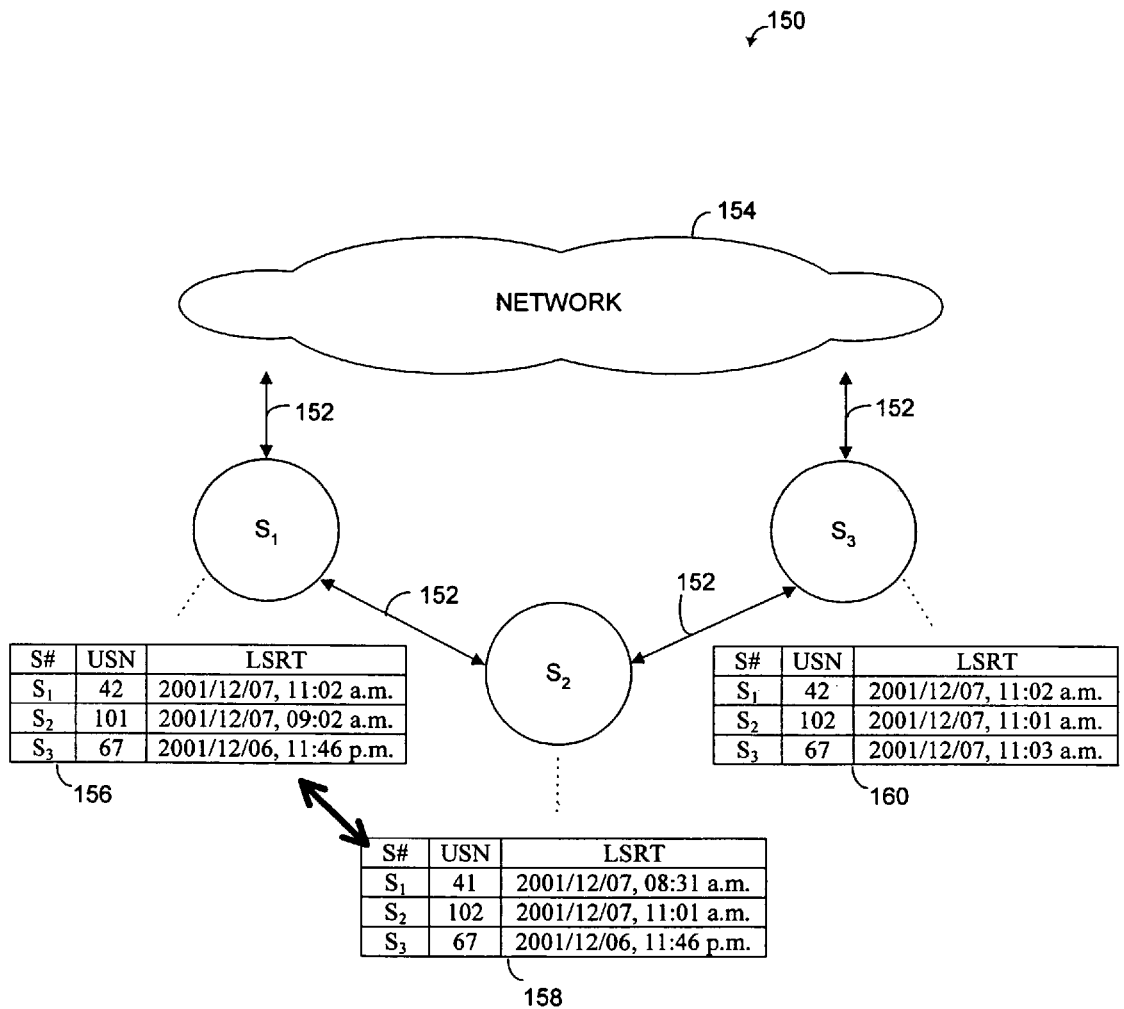
FIGS. 6a-6d show a simple store-and-forward replication system with several servers, each with an associated replica partner vector table, illustrating updates to the replica partner vector tables in accordance with one embodiment of the present invention.

For example, FIG. 6a depicts an exemplary networked computer system 150 which includes a plurality of servers (referenced as $S_1$, $S_2$, and $S_3$) interconnected by data links 152. Servers $S_1$, $S_2$, and $S_3$ are further connected to other servers in the network 154 via data links 152. Replica partner vector tables 156, 158, and 160 include a USN data field and an LSRT data field, for each server $S_1$, $S_2$, and $S_3$ in the networked computer system 150, to facilitate replication and status monitoring of servers and server updates.

As shown in FIG. 6a, replica partner vector table 156 for server $S_1$ indicates that the last object update to server $S_1$ was sequentially assigned a USN value 42 and successfully updated at 11:02 a.m. on Dec. 7, 2001, as indicated by the LSRT data field. Replica partner vector table 156 for server $S_1$ also indicates that server $S_1$ replicated an object update having a USN value 101 from server $S_2$ and that the last successful replication attempt for server $S_2$ occurred at 9:02 a.m. on Dec. 7, 2001, as indicated by the LSRT data field. Replica partner vector table 156 for server $S_1$ further indicates that server $S_1$ replicated an object update having a USN value 67 from $S_3$ and that the last successful replication attempt for server $S_3$ occurred at 11:46 p.m. on Dec. 6, 2001.

As shown in FIG. 6a, replica partner vector table 158 for server $S_2$ indicates that the last object update to server $S_2$ was sequentially assigned a USN value 102 and successfully updated at 11:01 a.m. on Dec. 7, 2001, as indicated by the LSRT data field. Replica partner vector table 158 for server $S_2$ also indicates that server $S_2$ replicated an object update having a USN value 41 from server $S_1$ and that the last successful replication attempt from server $S_1$ occurred at 8:31 a.m. on Dec. 7, 2001, as indicated by the LSRT data field. Replica partner vector table 158 for server $S_2$ further indicates that server $S_2$ replicated an object update having a USN value 67 from $S_3$ and that the last successful replication attempt for server $S_3$ occurred at 11:46 p.m. on Dec. 6, 2001.

As shown in FIG. 6a, replica partner vector table 160 for server $S_3$ indicates that the last object update to server $S_3$ was sequentially assigned a USN value 67 and successfully updated at 11:03 a.m. on Dec. 7, 2001, as indicated by the LSRT data field. Replica partner vector table 160 for server $S_3$ also indicates that server $S_3$ replicated an object update having a USN value 42 from server $S_1$ and that the last successful replication attempt for server $S_1$ occurred at 11:02 a.m. on Dec. 7, 2001,as indicated by the LSRT data field. Replica partner vector table 160 for server $S_3$ further indicates server $S_3$ replicated an object update having a USN value 102 from server $S_2$ and that the last successful replication attempt for server $S_3$ occurred at 11:01 a.m. on Dec. 7, 2001.

According to one embodiment of the invention, as server $S_1$ attempts replication from server $S_2$, server $S_1$ transmits its replica partner vector table 156 to server $S_2$. In another embodiment of the invention, server $S_1$ and server $S_2$ exchange their respective replica partner vector tables 156, 158. During replication, server $S_2$, upon receiving the replica partner vector table 156, compares the replica partner vector table 156 to its own replica partner vector table 158. A comparison of all entries in the USN data field and LSRT data field indicates that the data of server $S_2$ at server $S_1$ (i.e., USN value 101, LSRT value Dec. 7, 2001, 9:02 a.m.) is not current with respect to data at server $S_2$ (i.e., USN value 102, LSRT value Dec. 7, 2001, 11:01 a.m.). This comparison also indicates that the data of server $S_1$ at server $S_2$ (i.e., USN value 41, LSRT value Dec. 7, 2001, 8:31 a.m.) is not current with respect to data at server $S_1$ (i.e., USN value 42, LSRT value Dec. 7, 2001, 11:02 a.m.). During the replication process, server $S_1$ also compares the data of server $S_3$ at server $S_2$ (i.e., USN value 67, LSRT value Dec. 6, 2001, 11:46 p.m.) with its own data relating to server $S_3$ (i.e., USN value 67, LSRT value Dec. 6, 2001, 11:46 p.m.) revealing that the replica servers have the same updates and the same timestamps. After comparison of all other server data is complete, servers $S_1$ and $S_2$ replicate (i.e., transmit) any necessary updates and associated timestamps.

Figure 6B:
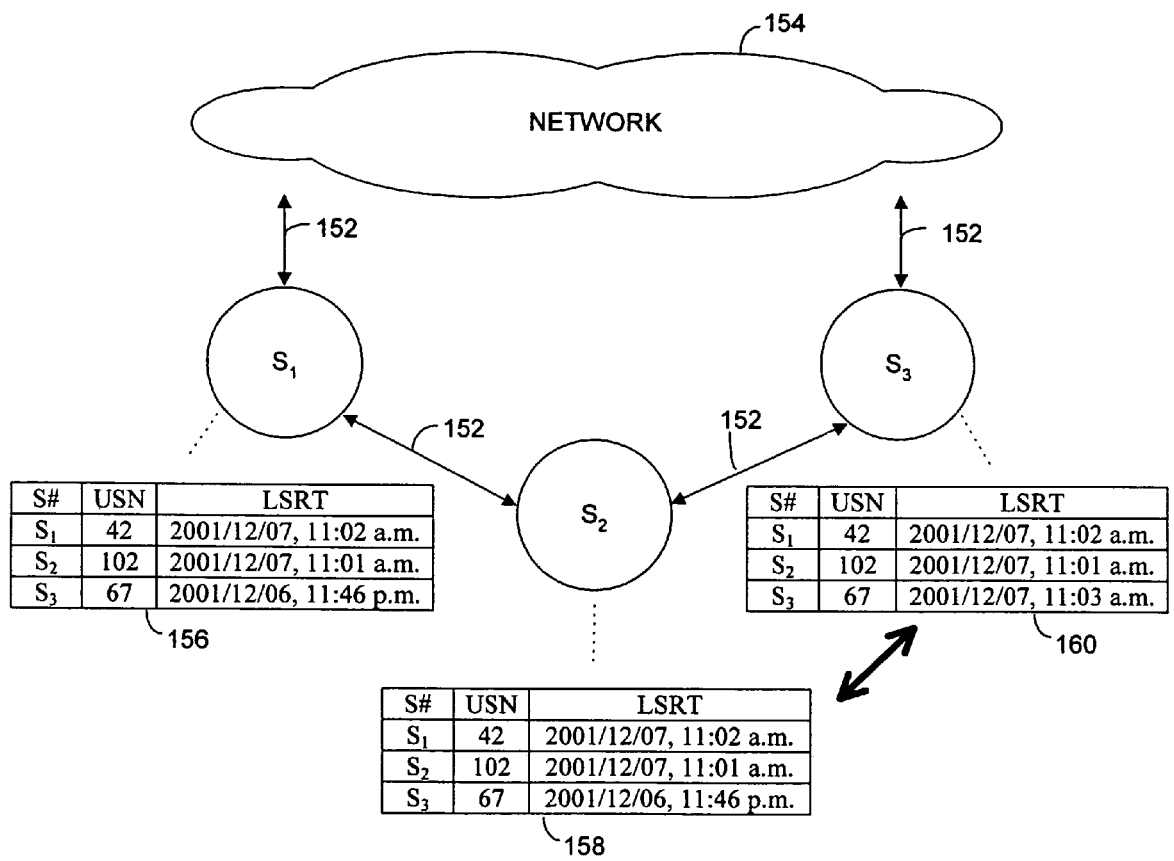

FIG. 6b depicts replica partner vector tables 156, 158 after server $S_2$ completes replication of the object data from server $S_1$ and server $S_1$ completes replication of the object data from server $S_2$. Server $S_1$ has improved its own replica partner vector table 156 to reflect a USN value 102 and an LSRT value Dec. 7, 2001, 11:01 a.m. indicating a successful replication attempt. Similarly, server $S_2$ has improved its own replica partner vector table 158 to reflect a USN value 42 and an LSRT value Dec. 7, 2001, 11:02 a.m. also indicating a successful replication attempt.

Figure 6C:
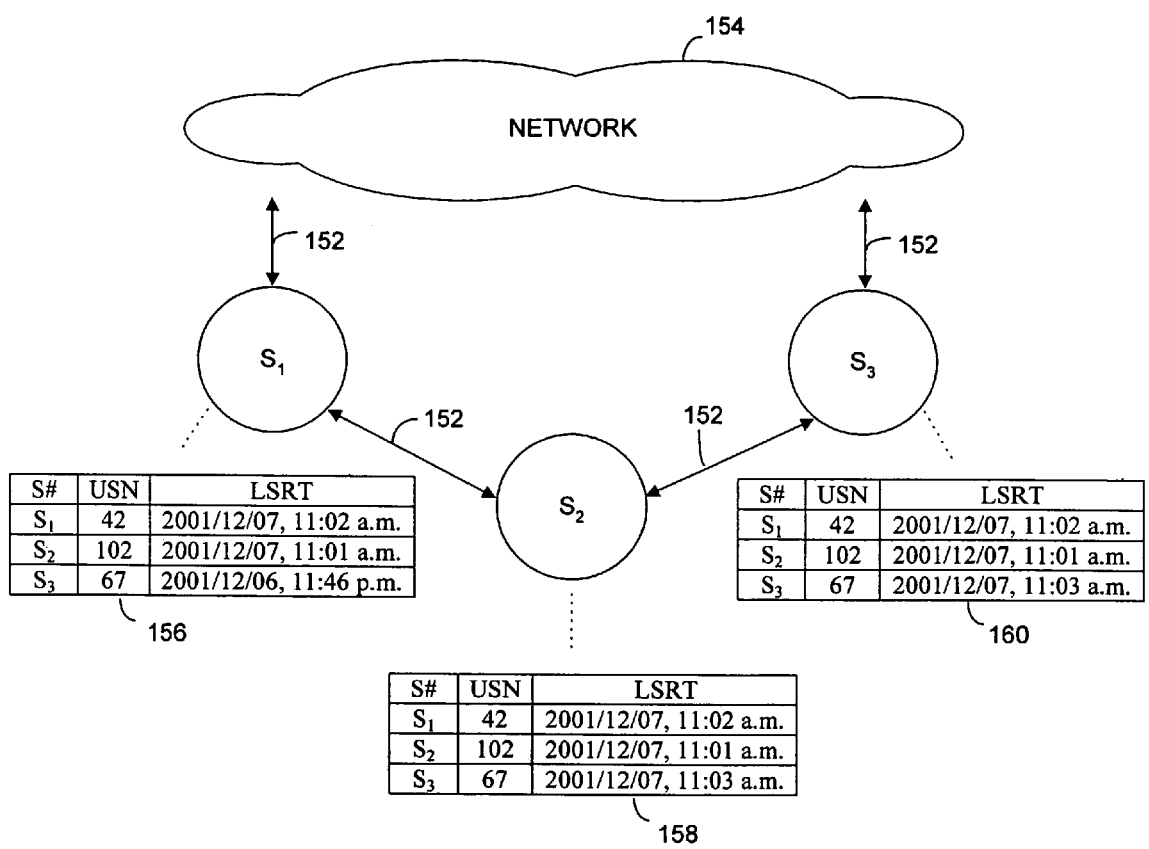

As shown in FIG. 6b, as server $S_2$ then attempts replication from server $S_3$, server $S_2$ transmits its improved replica partner vector table 158 to server $S_3$ and vice-versa. Server $S_3$, upon receiving the replica partner vector table 158, compares the replica partner vector table 158 to its own replica partner vector table 160. A comparison of all entries in the USN data field and LSRT data field indicates that the data related to servers $S_1$ and $S_2$ are updated with respect to the data in replica partner vector table 160, however, the data relating to server $S_3$ at server $S_2$ (i.e., USN value 67, LSRT value Dec. 6, 2001, 11:46 p.m.) is not current with respect to data at server $S_3$ (i.e., USN value 67, LSRT value Dec. 7, 2001, 11:03 a.m.). In situations where the USN is the same (e.g., both replica servers have the same set of updates), but the LSRT is different, the local server, in this case server $S_2$, improves its timestamp to be the same as the remote server, server $S_3$. Thus, FIG. 6c depicts replica partner vector table 158 after server $S_2$ replicates the timestamp data from server $S_3$.

Figure 7:
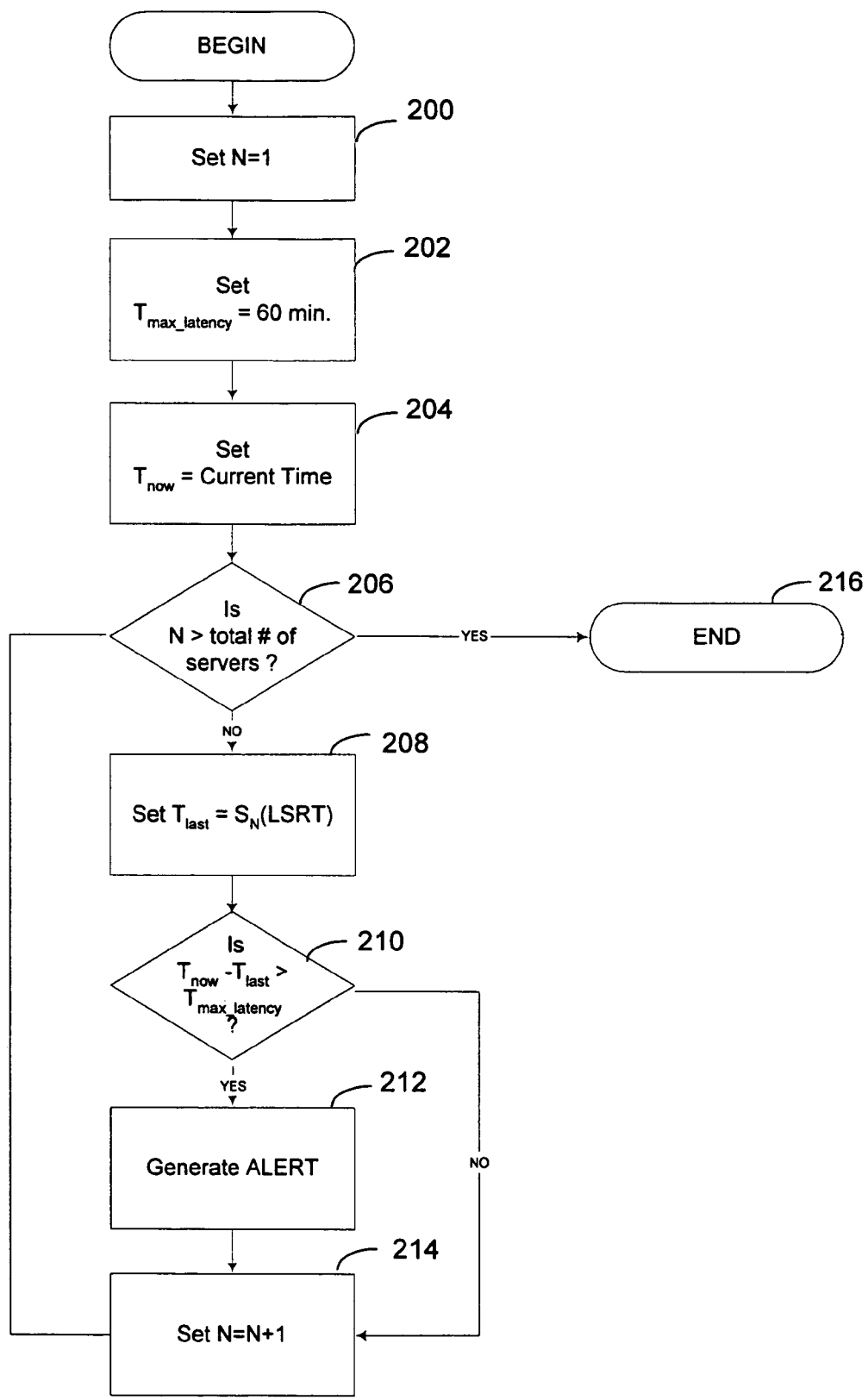
FIG. 7 is a flow diagram of an exemplary replication monitoring process in accordance with one embodiment of the present invention.

As a monitoring tool, the timestamp having a value of 11:03 a.m. indicates that server $S_3$ is functioning as opposed to being idle in the best-case scenario or non-functioning in the worst-case scenario. FIG. 7 is a flow diagram of an exemplary replication monitoring process performed by a replica server $S_1$ in the system. As shown in FIG. 7, at step 200, a counter N is set to 1. At step 202, the variable $T_{max\_latency}$ is set to the maximum allowable latency between two replica servers. In this example, $T_{max\_latency}$ is set to 60 minutes. However, it should be appreciated that the maximum allowable latency between replica servers in a network computer system can be set to any value, but is optimized, for example, for the best possible performance of the system. Optimization factors include the total time it takes a server to reset after a temporary failure and the acceptable dormancy of inactive servers.

At step 204, $T_{now}$ is set to the current time within the network computer system. Next, at step 206, the monitoring method determines whether the counter N is greater than the total number of servers in the system. If the counter N is not greater, then at step 208 the variable $T_{last}$ is set to the LSRT of $S_N$. $T_{last}$, therefore, represents the time at which the last successful replication was performed between the replica server $S_1$ and server $S_N$. At step 210, the monitoring method calculates the latency, $T_{now}$ minus $T_{last}$, and determines whether the latency value is greater than the maximum allowable latency, $T_{max\_latency}$.

If the latency is greater, then at step 212 an alert is generated. According to the invention, an alert may be any action that informs the user or network administrator that server $S_N$ is experiencing problems. By way of example, and not limitation, possible alerts include sending an email to users of the network system, displaying a message on the user's computer screen, sending a message or email to a network administrator or central monitoring, or attempting to repair the problematic server. After the alert is generated, or in the case where the latency is not greater, the monitoring method proceeds to step 214 where counter N is increased by one so that the next server can be examined. Returning to step 206, the monitoring method again determines whether the counter N is greater than the total number of servers in the system.

When counter N exceeds the number of servers in the network system indicating that the monitoring method has completed latency evaluation of all the servers identified in the replica partner vector table for replica server $S_1$, the monitoring method ends at step 216. Alternatively, the monitoring method may proceed to step 200 where counter N is reset to 1, thus, allowing the monitoring process to repeat indefinitely.

Figure 6D:
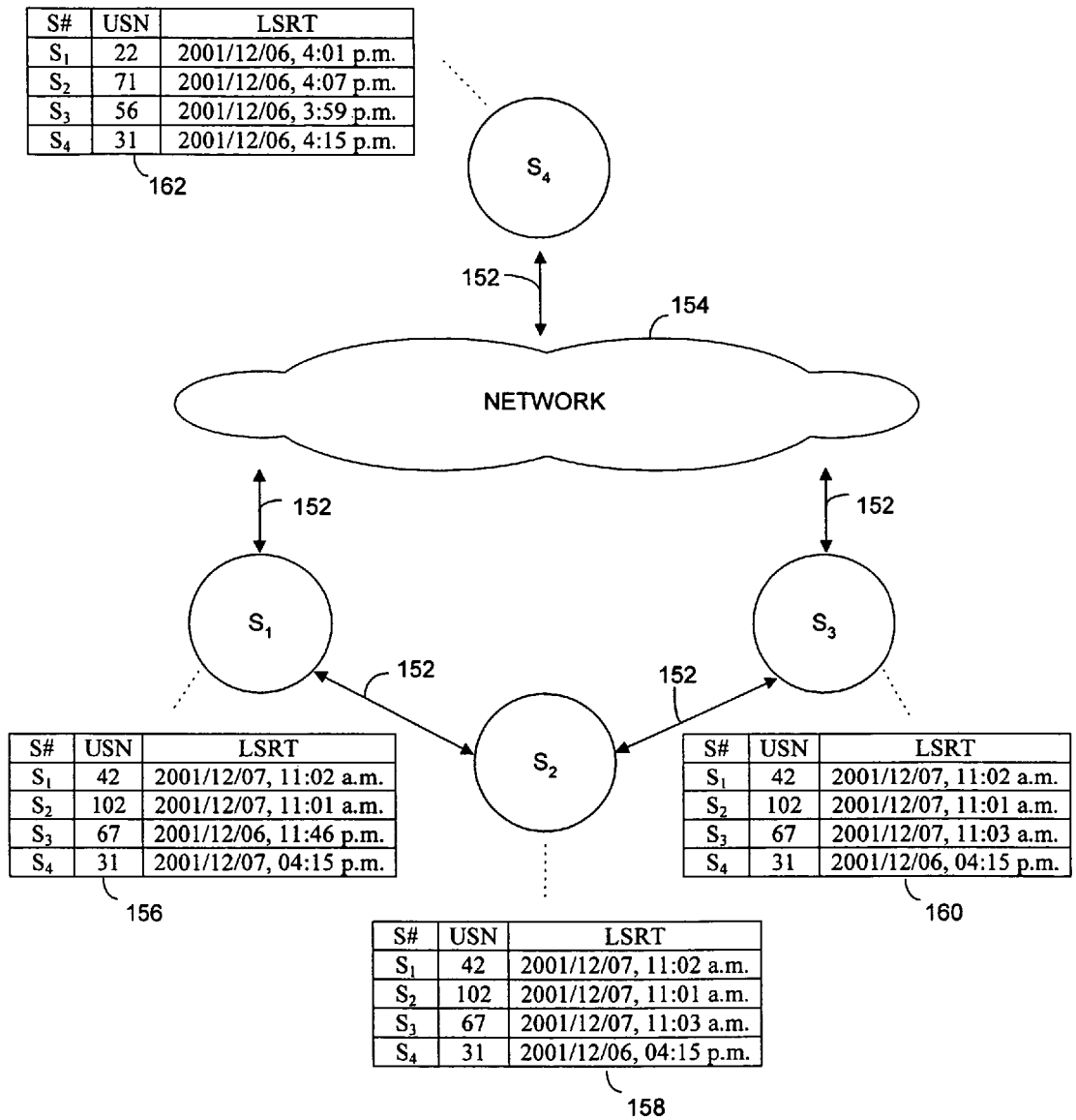

In the example shown in FIG. 6d, server $S_4$ is interconnected to the networked computer system 150 via data link 152. Server $S_4$ includes a replica partner vector table 162 that indicates that the last object update to server $S_4$ was assigned a USN value 31 and successfully updated at 4:15 p.m. on Dec. 6, 2001. Replica partner vector table 162 also indicates server $S_4$ replicated object updates from server $S_1$ (i.e., USN value 22, LSRT value Dec. 6, 2001, 4:01 p.m.), server $S_2$ (i.e., USN value 71, LSRT value Dec. 6, 2001, 4:07 p.m.), and server $S_3$ (i.e., USN value 56, LSRT value Dec. 6, 2001, 3:59 p.m.).

By way of example, the monitoring method described in FIG. 7 is explained with respect to the system shown in FIG. 6d, in particular server $S_2$. At steps 200-204, counter N is set to 1, $T_{max\_latency}$ is set to 60 minutes, and $T_{now}$ is set to Dec. 7, 2001, 11:05 a.m. At step 206, counter N is compared to the total number of servers in networked computer system 150, a number greater than four because servers $S_1$, $S_2$, $S_3$, and $S_4$ are connected to other servers in the network 154. At step 208, $T_{last}$ is set to $S_1$(LSRT) which according to replica partner vector table 158 is Dec. 7, 2001, 11:02 a.m. A comparison at step 210 reveals that $T_{now}$ minus $T_{last}$ (i.e., Dec. 7, 2001, 11:05 a.m. minus Dec. 7, 2001, 11:02 a.m., or 3 minutes) is not greater than maximum allowable latency, $T_{max\_latency}$, of 60 minutes. As a result, the monitoring method proceeds to step 214, where counter N is incremented to 2, and then on to step 206.

At step 206, counter N is again compared to the total number of servers in networked computer system 150. Because N is less, at step 208, $T_{last}$ is set to $S_2$(LSRT) which according to replica partner vector table 158 is Dec. 7, 2001, 11:01 a.m. A comparison at step 210 reveals that $T_{now}$ minus $T_{last}$ (i.e., Dec. 7, 2001, 11:05 a.m. minus Dec. 7, 2001, 11:01 a.m., or 4 minutes) is not greater than maximum allowable latency, $T_{max\_latency}$, of 60 minutes. Importantly, since the monitoring method is running on server $S_2$, an evaluation of the latency of $S_2$(LSRT) demonstrates an embodiment of the invention whereby a server can conduct self-monitoring of its own updates. Since a server is constantly replicating its own updates and the LSRT is updated to reflect the current time, the latency in this situation should be zero or near zero if the server is functioning properly.

Counter N is then incremented to 3 at step 214 and another comparison is made at step 206. At step 208, $T_{last}$ is set to $S_3$(LSRT) which according to replica partner vector table 158 is Dec. 7, 2001, 11:03 a.m. A comparison at step 210 reveals that $T_{now}$ minus $T_{last}$ (i.e., Dec. 7, 2001, 11:05 a.m. minus Dec. 7, 2001, 11:03 a.m., or 2 minutes) is not greater than maximum allowable latency, $T_{max\_latency}$, of 60 minutes.

After counter N is incremented to 4 at step 214 and another comparison is made at step 206. At step 208, $T_{last}$ is set to $S_4$(LSRT) which according to replica partner vector table 158 is Dec. 6, 2001, 4:15 p.m. A comparison at step 210 reveals that $T_{now}$ minus $T_{last}$ (i.e., Dec. 7, 2001, 11:05 a.m. minus Dec. 6, 2001, 4:15 p.m., or 18 hours, 10 minutes) is greater than maximum allowable latency, $T_{max\_latency}$, of 60 minutes and thus, an alert is generated at step 212. After the alert is generated, counter N is once again incremented and the method continues until all servers in the computer system 150 have been evaluated.

It can thus be seen that a new and useful method for monitoring updates to replica servers in a replication system has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for monitoring replication latency in a computer system comprising a plurality of servers connected by a plurality of data links, and wherein the servers periodically replicate object updates with one another and maintain an update sequence number that is increased upon update to the server's replica of a database, the method comprising:

first maintaining, by each of the plurality of servers, a timestamp that is posted upon each update to the server's database;

second maintaining, by two or more of the plurality of servers, a replica partner vector table that comprises for each other server from which the server replicates, the update sequence number of such other server at a time of a most recent replication from such other server and the timestamp of the last successful replication attempt with such other server;

transmitting a copy of the replica partner vector table of a local server to a remote server;

comparing, by the remote server, both the update sequence numbers and timestamps in the replica partner vector table received from the local server to both the update sequence numbers and timestamps in the replica partner vector table of the remote server;

updating, by the remote server, the replica partner vector table received from the local server;

transmitting, by the remote server, a copy of the updated replica partner vector table and object updates to the local server;

improving, by the local server, upon receiving the updated replica partner vector from the remote server, update sequence numbers and timestamps in the partner vector table of the local server; and calculating, by the local server, a difference between the timestamp for each server in the replica partner vector table and a current time.

2. The method of claim 1, further comprising:

transmitting a copy of the remote server's replica partner vector table to the local server;

comparing the remote server's replica partner vector table with the local server's replica partner vector table;

updating the replica partner vector table received from the remote server; and transmitting a copy of the updated replica partner vector table and object updates to the remote server.

3. A computer storage medium having computer-executable components thereon for monitoring replication latency in a computer system, the computer system comprising a plurality of servers connected by a plurality of data links, and wherein the servers periodically replicate object updates with one another and maintain an update sequence number that is increased upon update to the server's replica of a database, the components performing the steps of:

first maintaining, by each of the plurality of servers, a timestamp that is posted upon each update to the server's database;

second maintaining, by two or more of the plurality of servers, a replica partner vector table that includes for each other server from which the server replicates, the update sequence number of such other server at a time of a most recent replication from such other server and the timestamp of the last successful replication attempt with such other server;

transmitting a copy of the replica partner vector table of a local server to a remote server;

comparing, by remote server, both the update sequence numbers and timestamps in the replica partner vector table received from the local server to both the update sequence numbers and timestamps in the replica partner vector table of the remote server;

updating, by the remote server, the replica partner vector table received from the local server;

transmitting, by the remote server, a copy of the updated replica partner vector table and object updates to the local server;

improving, by the local server, upon receiving the updated replica partner vector from the remote server, update sequence numbers and timestamps in the partner vector table of the local server; and calculating, by the local server, a difference between the timestamp for each server in the replica partner vector table and a current time.

4. A computer storage medium as defined in claim 3, further comprising:

transmitting a copy of the remote server's replica partner vector table to the local server;

comparing the remote server's replica partner vector table with the local server's replica partner vector table;

updating the replica partner vector table received from the remote server; and transmitting a copy of the updated replica partner vector table and object updates to the remote server.

* * * * *

UNITED STATES PATENT AND TRADEMARK OFFICE
CERTIFICATE OF CORRECTION

| | | |
|---|---|---|
| PATENT NO. | : 7,519,736 B2 | Page 1 of 1 |
| APPLICATION NO. | : 11/357601 | |
| DATED | : April 14, 2009 | |
| INVENTOR(S) | : Jeffrey B. Parham | |

It is certified that error appears in the above-identified patent and that said Letters Patent is hereby corrected as shown below:

On page 6, in field (56), under "Other Publications" column 2, line 17,
below "E. Stokes et al., The LDUP Replication Update Protocol. Internet-Draft
draft-ietf-ldup-protocol-03.txt (Work in Progress). Internet Engineering Task Force, Nov. 2001"
insert -- John Fontana, "How to avoid directory service headaches, Sept. 6, 1999,
Network World, 37, 39.

Microsoft Corporation, Active Directory Architecture White Paper, Redmond, Washington,
2000.

Internet Engineering Task Force. LDAP Duplication/Replication/Update Protocols (Ldup).
IETF March 2000 Proceedings, § 2.1.8. Available:
http://www.ietf.org/proceedings/00mar/47$^{th}$-ietf-00mar-22.html, June 17, 2004.

J Merreils et al. LDAP Replication Architecture. Internet-Draft draft —
ietf-ldup-model-06.txt (Work in Progress). Internet Engineering Task Force, March 2, 2000. --.

Signed and Sealed this

Third Day of May, 2011

David J. Kappos
*Director of the United States Patent and Trademark Office*